United States Patent
Kaneko et al.

(10) Patent No.: US 7,170,665 B2
(45) Date of Patent: Jan. 30, 2007

(54) OPTICAL UNIT PROVIDED WITH AN ACTUATOR

(75) Inventors: Shinji Kaneko, Kokubunji (JP); Kimihiko Nishioka, Hachioji (JP); Takeshi Nakane, Hachioji (JP); Toshihiro Nakao, Hachioji (JP)

(73) Assignee: Olympus Corporation, Tokyo (JP)

( * ) Notice: Subject to any disclaimer, the term of this patent is extended or adjusted under 35 U.S.C. 154(b) by 430 days.

(21) Appl. No.: 10/201,625

(22) Filed: Jul. 24, 2002

(65) Prior Publication Data

US 2004/0017620 A1   Jan. 29, 2004

(51) Int. Cl.
   *G02B 26/00* (2006.01)
   *G02B 26/08* (2006.01)
   *H02K 35/00* (2006.01)

(52) U.S. Cl. ......................... 359/290; 359/224; 310/22

(58) Field of Classification Search ............... 359/224, 359/259, 290–292, 298, 223, 295, 813; 257/415; 310/22, 36
See application file for complete search history.

(56) References Cited

U.S. PATENT DOCUMENTS

| | | | | |
|---|---|---|---|---|
| 5,097,354 A * | 3/1992 | Goto | ........................... | 359/212 |
| 5,877,806 A * | 3/1999 | Kawano | ................... | 348/219.1 |
| 5,894,090 A * | 4/1999 | Tang et al. | .............. | 73/504.02 |
| 5,920,417 A * | 7/1999 | Johnson | ........................ | 359/223 |
| 5,999,303 A * | 12/1999 | Drake | ......................... | 359/224 |
| 5,999,306 A * | 12/1999 | Atobe et al. | ................. | 359/295 |
| 6,122,089 A * | 9/2000 | Minamoto et al. | .......... | 359/198 |
| 6,175,443 B1 * | 1/2001 | Aksyuk et al. | ............. | 359/291 |
| 6,285,489 B1 * | 9/2001 | Helsel et al. | ................ | 359/291 |
| 6,289,733 B1 * | 9/2001 | Challoner et al. | ........ | 73/504.12 |
| 6,341,039 B1 * | 1/2002 | Flanders et al. | ............. | 359/578 |
| 6,369,400 B1 * | 4/2002 | Haeberle et al. | ............ | 250/548 |
| 6,397,008 B2 * | 5/2002 | Kuwana et al. | ................ | 396/55 |
| 6,473,221 B2 * | 10/2002 | Ueda et al. | .................. | 359/298 |
| 6,633,693 B1 * | 10/2003 | Peale et al. | .................... | 385/18 |
| 6,795,225 B2 * | 9/2004 | Tsuboi et al. | ................ | 359/224 |
| 6,812,617 B2 * | 11/2004 | Ives | ........................... | 310/309 |

(Continued)

FOREIGN PATENT DOCUMENTS

JP       08-322227        12/1996

(Continued)

OTHER PUBLICATIONS

Rai-Choudhury (ed.), "Handbook of Microlithography, Micromachinig and Microfabrication—vol. 2: Micromachining and Microfabrication," The International Society for Optical Engineering, © 1997, pp. 484-497.

*Primary Examiner*—Ricky Mack
*Assistant Examiner*—William Choi
(74) *Attorney, Agent, or Firm*—Pillsbury Winthrop Shaw Pittman LLP

(57) ABSTRACT

An optical unit is constructed by superposing and cementing the first substrate having fixed electrodes and the second substrate having a sheet-like member in which a moving plate-spring-like electrode is provided. Concentric through holes are provide at the middles of the sheet-like member of the first substrate and the second substrate, and an optical element, such as a lens, a mirror, or a prism, is mounted to the through hole of the sheet-like member. When voltages applied between the fixed electrodes and the moving electrode are controlled, the sheet-like member is displaced and thereby the optical element is deformed.

30 Claims, 26 Drawing Sheets

U.S. PATENT DOCUMENTS

| | | | |
|---|---|---|---|
| 6,850,349 B2* | 2/2005 | Miyajima et al. | 359/199 |
| 6,943,966 B2* | 9/2005 | Konno | 359/819 |
| 2002/0102102 A1* | 8/2002 | Watanabe et al. | 396/89 |
| 2002/0118429 A1* | 8/2002 | Miyajima et al. | 359/224 |
| 2002/0135846 A1* | 9/2002 | Miyajima et al. | 359/199 |

FOREIGN PATENT DOCUMENTS

| | | |
|---|---|---|
| JP | 2000-267010 | 9/2000 |
| JP | 2001-004809 | 1/2001 |

\* cited by examiner

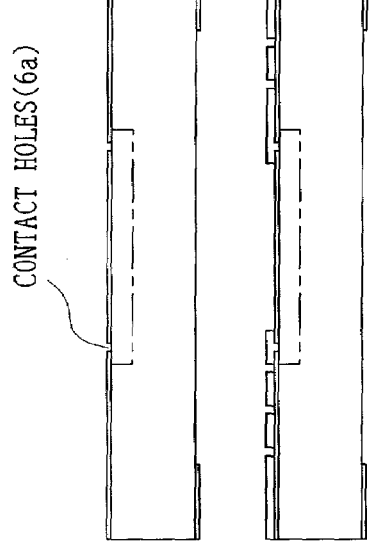
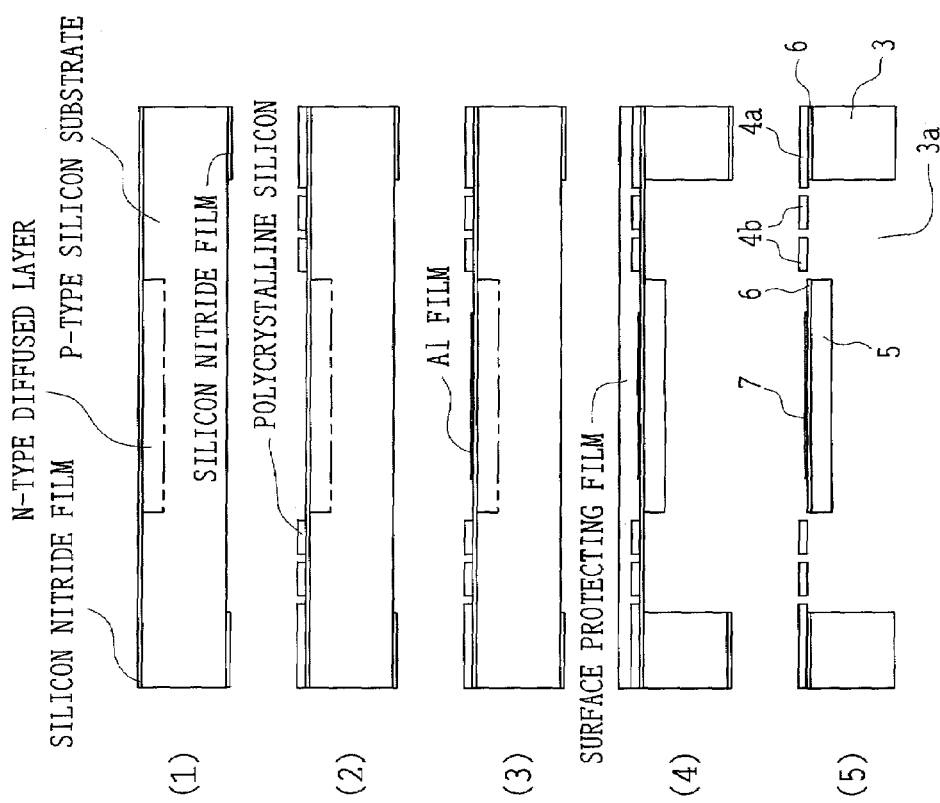
FIG. 4A / FIG. 4B

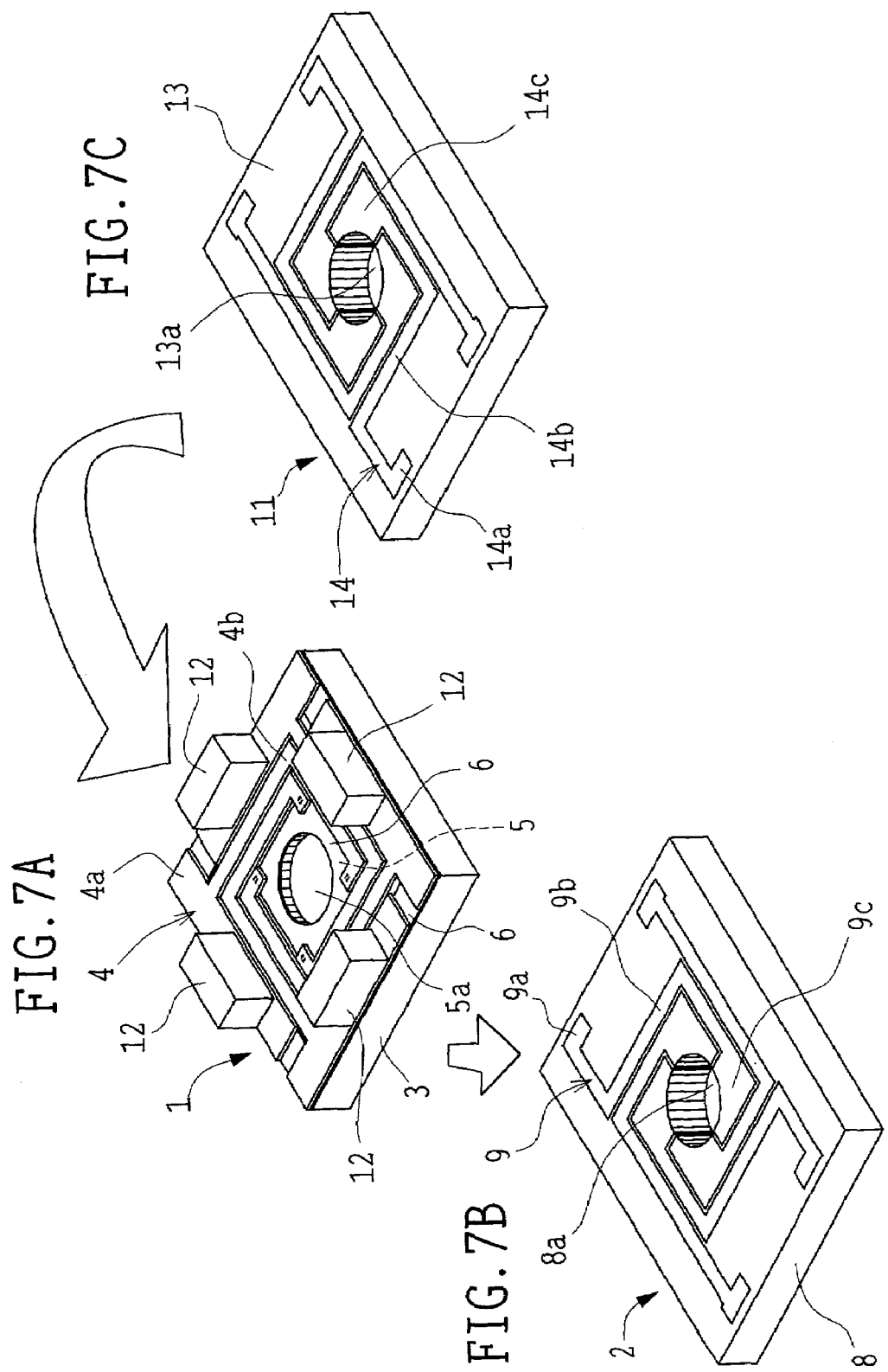

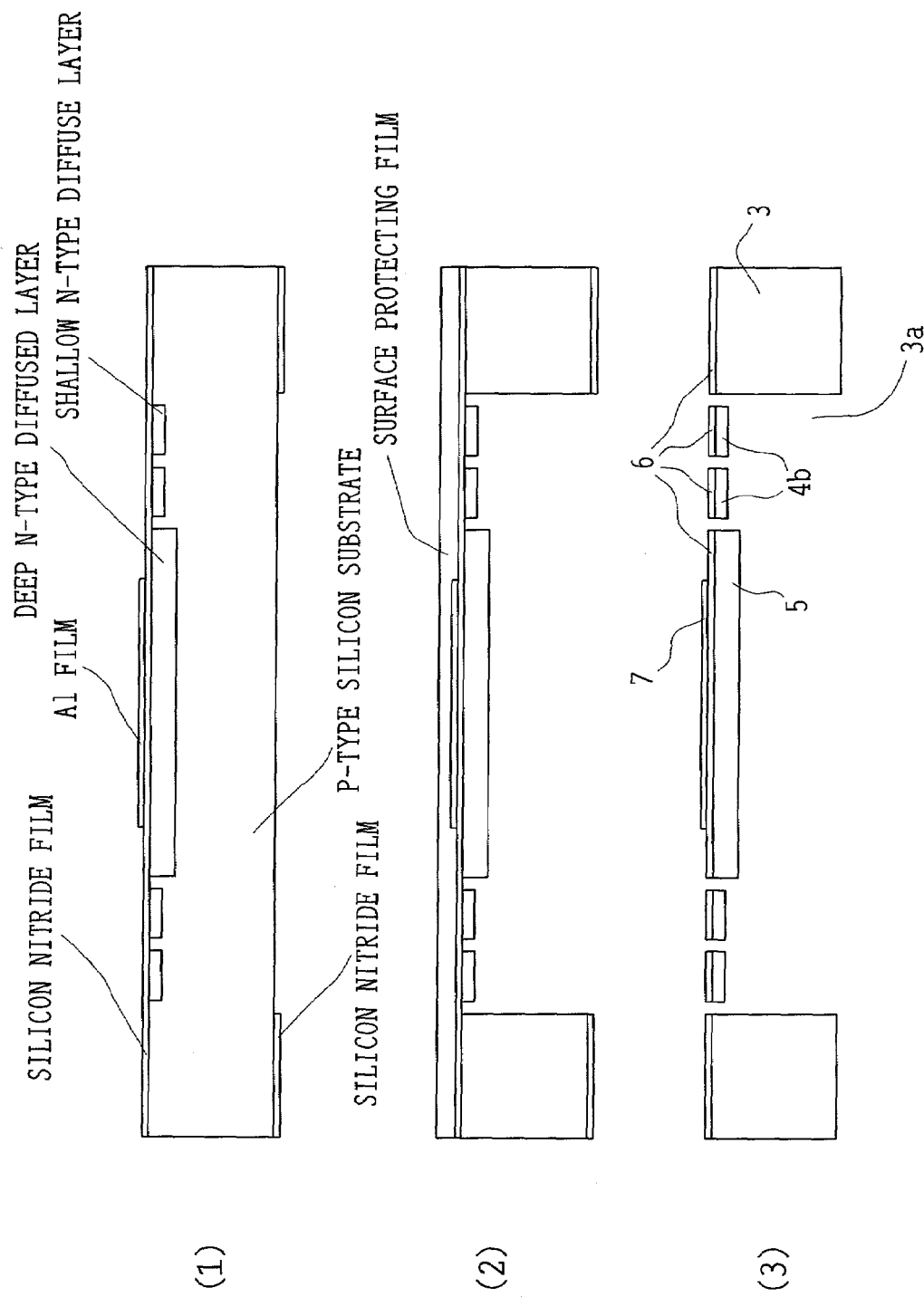

OPTICAL UNIT PROVIDED WITH AN ACTUATOR

BACKGROUND OF THE INVENTION

1. Field of the Invention

This invention relates to an optical unit in which an optical element, such as a mirror, and an actuator for making its positioning control are integrally constructed, and in particular, to an optical unit suitable for fabrication with the use of a semiconductor manufacturing technique.

2. Description of the Related Art

A technique that an optical element, such as a mirror, a lens, a diffraction grating, or a pinhole plate, is controlled by an actuator so that its direction and position are changed has long been known. In recent years, however, it is a common practice to fabricate the optical element and the actuator as a unit. In particular, for an optical unit incorporated in a small-sized electronic device, the semiconductor manufacturing technique has come into prominent use for fabrication. A conventional example of such an optical unit fabricated by using the semiconductor manufacturing technique is disclosed in Japanese Patent Kokai No. Hie 8-322227.

This conventional example uses a gimbal structure so that a mirror is displaced by the torsional function of a torsion bar. As such, it has the feature that a two-dimensional tilt displacement is achieved on the optical path with respect to the mirror and a scan can be performed with reflected light. Since, as mentioned above, the optical unit can be fabricated by using the semiconductor manufacturing technique, this is advantageous for compactness of the unit. Furthermore, an electromagnetic driving system is used, and thus a low-voltage drive is possible.

Although the conventional example is capable of performing the tilt displacement of the mirror on the optical path, no account is taken of the technique that the mirror is caused to rest at an arbitrary tilting position, and this technique is basically difficult in structure. When the conventional example is designed so that the whole of the mirror can also be displaced in a vertical direction (along the optical axis of incident light), a longer torsion bar must be provided. This not only requires a greater driving force, but also causes oversizing of the unit, and there is the problem that the optical unit has no practical use. Moreover, the conventional example, which is of the electromagnetic driving system, has the structure that a large number of parts, such as permanent magnets, are basically required, which is disadvantageous for compactness and cost reduction. Although a driving voltage is low, power consumption is somewhat increased, and thus there is a case where it is not necessarily electrically advantageous.

In an optical apparatus such as a digital camera, for focusing, zoom, and shake prevention, motors and solenoids have been used as driving sources of driving means for displacing optical elements constituting an optical system with respect to their functions, and the displacements of the optical elements have been controlled by mechanical means such as gears and cams.

Specifically, the motors and mechanical means must be driven in accordance with focusing and zoom, and hence power consumption is increased. In addition, since the mechanical means, such as gears, provided to displace the optical elements must be started for operation and stopped, response time is long. Furthermore, optical performance cannot be achieved with a high degree of accuracy because of the error of backlash of the mechanical means.

SUMMARY OF THE INVENTION

It is, therefore, a primary object of the present invention to provide an optical unit which has an actuator constructed extremely advantageous for compactness and cost reduction so that an optical element, such as a mirror, a lens, a diffraction grating, or a pinhole plate, placed on the optical path is controlled relative to various positions on the optical path in accordance with an electric potential imparted to an electrode.

It is another object of the present invention to provide an optical unit in which power consumption is minimized and response time is short when the optical element is displaced for focusing, zoom, and shake prevention in an optical apparatus.

In order to achieve the first object mentioned above, the optical unit of the present invention includes a first substrate in which a plurality of beam members, each having a crank- or curve-shaped flexible beam portion, are connected to a sheet-like member that an optical element is mounted thereto or integrally constructed therewith and to a frame member provided so as to surround the sheet-like member and at least one of the sheet-like member and the beam members is constructed as a first layer electrode, and a second substrate having a second layer electrode in an area opposite to the first layer electrode, cemented to the frame member. When the electric potential between the first and second layer electrodes is changed, the sheet-like member is displaced by an electrostatic force so that the position of the optical element is controlled on the optical path.

In the optical unit of the present invention mentioned above, the sheet-like member is supported through the frame member by at least three beam members, and at least one of the first and second layer electrodes is divided into at least three electrode segments, to which different electric potentials are imparted. Whereby, the tilt and distance between the sheet-like member and the second substrate are changed. The result is further favorable.

In order to achieve the second object mentioned above, the optical unit of the present invention is constructed with a plate spring actuator.

According to the present invention, the optical unit is constructed so that the plate spring actuator is used to achieve focusing (compensation for movement of an object), shake prevention, correction for assembly error, compensation for a change of the optical system by a change in temperature or humidity, and at least one of a magnification change, zoom, and diopter adjustment.

According to the present invention, the optical unit is constructed so that, for example, at least one plate spring actuator is used to drive the optical element.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 4A is a sectional view taken along line A—A in FIG. 3A, for explaining a manufacturing process in the first embodiment;

FIG. 4B is a sectional view taken along line B—B in FIG. 3A, for explaining the manufacturing process in the first embodiment;

FIG. 7A is a perspective view showing the first substrate in a fourth embodiment of the present invention;

FIG. 7B is a perspective view showing the second substrate in the fourth embodiment;

FIG. 7C is a perspective view showing a third substrate in the fourth embodiment;

FIG. 9 is a sectional view for explaining the manufacturing process of the first substrate in the fifth embodiment;

DETAILED DESCRIPTION OF THE PREFERRED EMBODIMENTS

In the embodiments to be described below, like numerals are used for like members and parts, and their explanation is omitted.

First Embodiment

Figure 1:
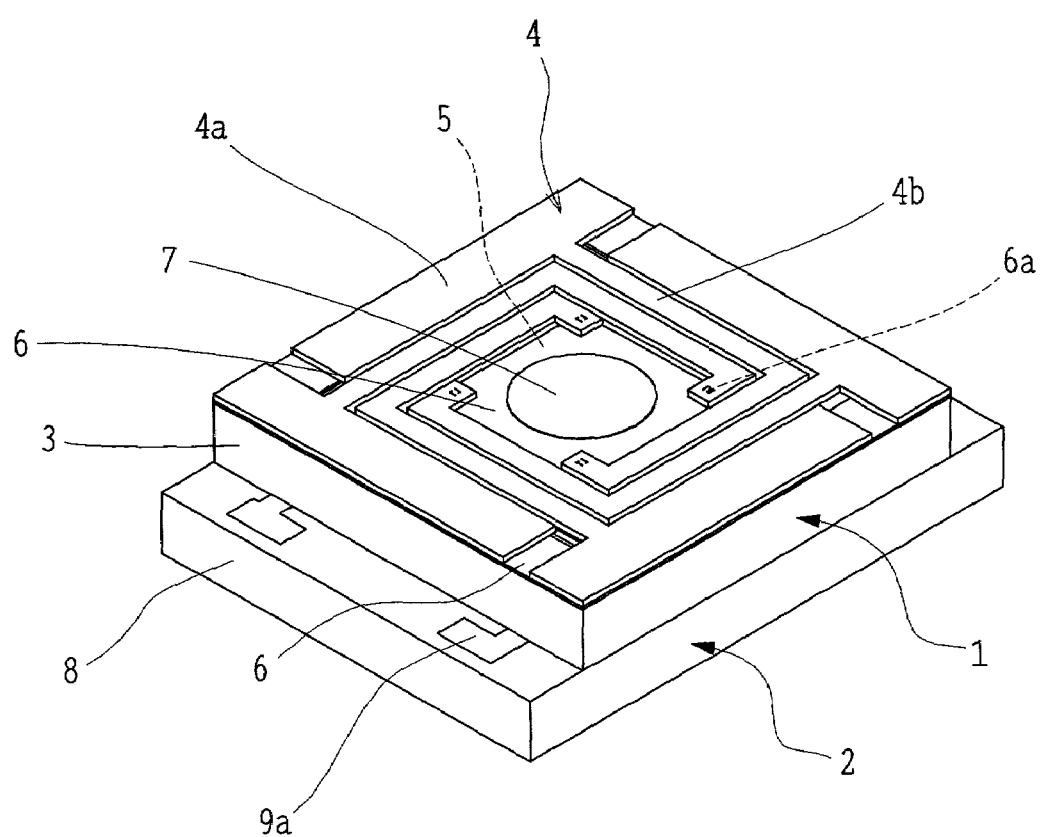
FIG. 1 is a perspective view showing the whole of a first embodiment of the present invention.
Figure 2A:
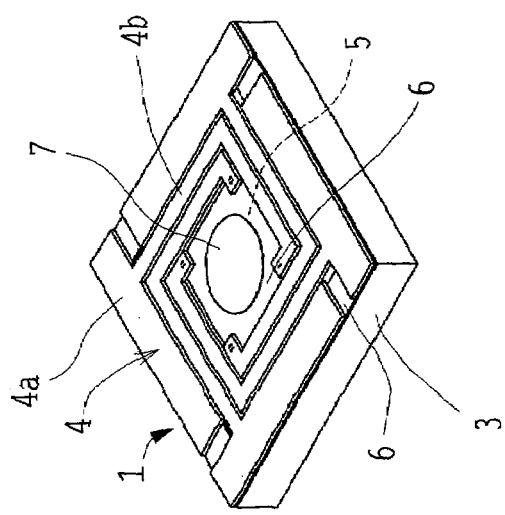
FIG. 2A is a perspective view showing a first substrate in the first embodiment.
Figure 2B:
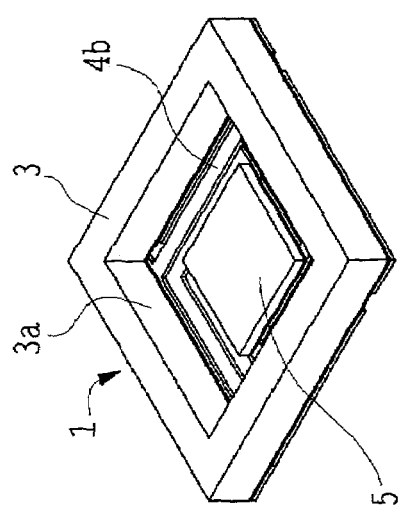
FIG. 2B is a perspective view showing the reverse side of the first substrate.
Figure 2C:
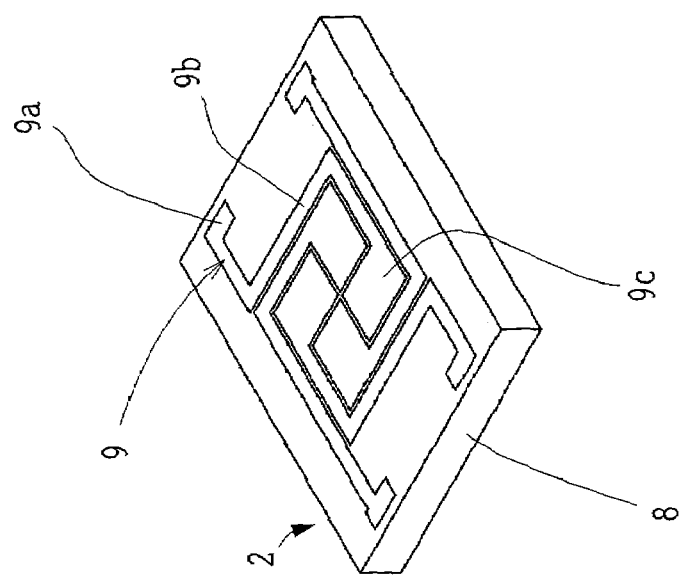
FIG. 2C is a perspective view showing a second substrate in the first embodiment.

The structure of this embodiment is explained with reference to FIGS. 1 and 2A–2C. The optical unit is constructed by cementing a first substrate 1 to a second substrate 2. FIGS. 2A–2C show the first substrate 1 and the second substrate 2 which are separated. In particular, FIG. 2B shows the reverse side of the first substrate 1 in FIG. 2A.

The first substrate 1 is constructed with a frame member 3, four beam members 4 (this reference numeral 4 is used for one beam member alone), and a sheet-like member 5. Of these members, the frame member 3 is square in shape and is provided with a square opening 3a at the middle. Each of the four beam members 4 is constructed of polycrystalline silicon in which an n-type impurity is doped, and has a leading wire portion 4a and a crank-shaped beam portion 4b. An insulating silicon nitride film 6 is provided between the leading wire portion 4a and the frame member 3.

The sheet-like member 5 is constructed of single-crystal silicon in which the n-type impurity is doped, and is square in shape. The sheet-like member 5 is provided in the opening 3a of the frame member 3 and is integrally connected to the beam potions 4b of the beam members 4. In the sheet-like member 5, the insulating silicon nitride film 6 is deposited on its surface and has four contact holes 6a, so that the sheet-like member 5 is electrically conducted to the beam portions 4b and is capable of functioning as a first layer electrode, together with the beam members 4. At the middle of the sheet-like member 5, a mirror 7 with an aluminum film is provided.

In the first substrate 1 constructed as mentioned above, each of the beam portions 4b of the beam members 4 has flexibility. The beam portion 4b, which is configured into a crank shape so as to surround the sheet-like member 5, has a small occupied area, but is capable of increasing its length. Thus, the spring constant of the beam portion 4b can be reduced, and the sheet-like member 5 can be displaced by a less electrostatic force. Also, although in the first embodiment the beam portion 4b has the shape of the letter "L", the same feature is obtained even in the case of the letter "U" or an arc shape which will be described later. Further, in the first embodiment, the mirror 7 is provided on the sheet-like member 5, but instead of the mirror 7, an optical element such as a diffraction grating or the like may be used.

On the other hand, the second substrate 2 is constructed with a base member 8 and fixed electrode members 9 (this reference numeral 9 is used for one fixed electrode member alone) divided into four, functioning as a second layer electrode. Each of the four fixed electrode members 9 has a leading wire portion 9a, a first area 9b of L shape, and a second area 9c of square shape. The first area 9b is provided opposite to the beam portion 4b, and the four second areas 9c are arranged opposite to four segments into which the sheet-like member 5 is practically divided.

Subsequently, the operation of the first embodiment is described with reference to FIGS. 3A and 3B.

As mentioned above, the four beam members 4 of the first substrate 1 have the leading wire portions 4a, one for each member, but are electrically connected through the conductive sheet-like member 5. In contrast to this, the four fixed electrode members 9 of the second substrate 2 are insulated from one another and are independent.

Figure 3A:
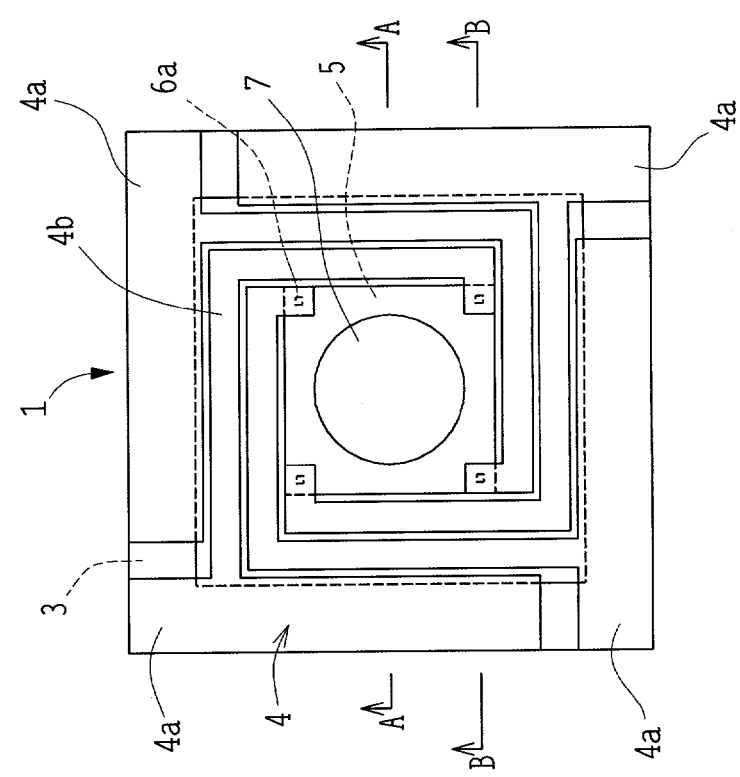
FIG. 3A is a plan view showing the first substrate.
Figure 3B:
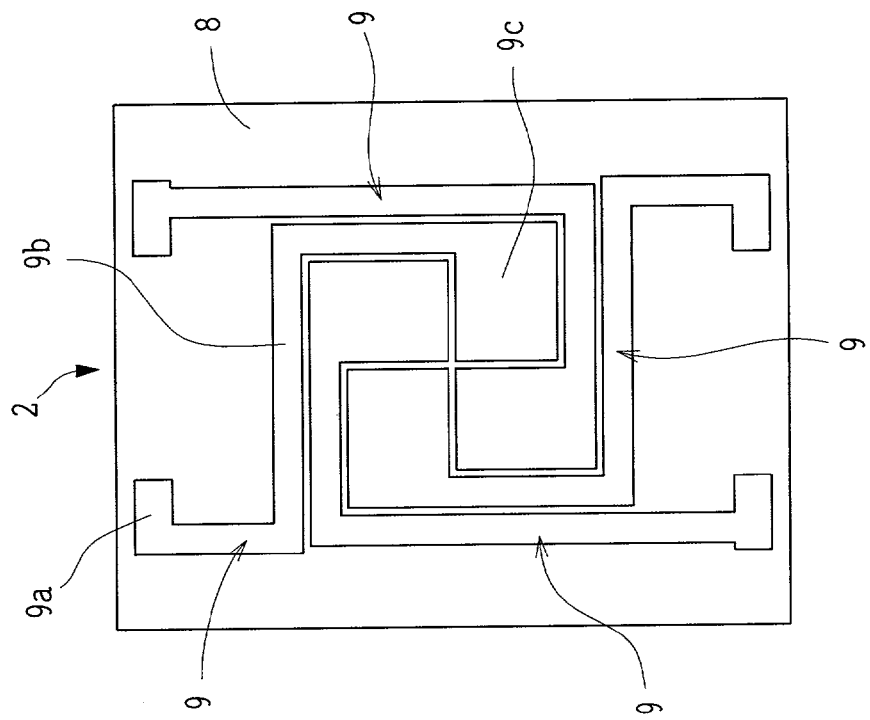
FIG. 3B is a plan view showing the second substrate.

In such a connecting relationship, for example, when the first layer electrode is grounded and a high voltage is applied to the leading wire portion 9a located upper-left in FIG. 3B, electrostatic attractive forces are exerted with respect to the lower-right area of the sheet-like member 5 opposite to the electrode and the beam portion 4b connected to this area. In this case, when the other three electrodes of the second layer electrode are grounded, electrostatic attractive forces are not exerted with respect to the other areas of the sheet-like member 5 and the other three beam members 4 connected to these areas, and hence only the lower-right area of the sheet-like member 5 is attracted to the second substrate 2. Consequently, the sheet-like member 5 tilts toward the second substrate 2, and a distance between the center of the sheet-like member 5 and the second substrate 2 is reduced so that the angle of reflection of the mirror 7 is changed. The amount of displacement of the sheet-like member 5 depends on the value of an applied voltage.

When the first layer electrode is grounded and identical voltages are applied to the four electrode segments of the second layer electrode, electrostatic attractive forces are equally exerted with respect to the sheet-like member 5 and the four beam members 4. The sheet-like member 5, therefore, maintains a parallel condition in a vertical direction, that is, against the second substrate 2 and is displaced by a distance corresponding to the voltage value. Thus, in the case where it is only necessary to perform such a displacement, there is no need to divide the second layer electrode as in the first embodiment.

In the first embodiment, as described above, at least one of the four electrodes provided on the second substrate 2 is selected at will and the value of the voltage applied thereto is set to a preset value or is continuously changed. Whereby, the tilt and vertical displacement of the sheet-like member 5 can be arbitrarily controlled. In the first embodiment, the fixed electrode member 9 is provided with the first area 9b and the second area 9c so that electrostatic attractive forces are exerted with respect to an area to be displaced and the beam portion 9b connected to this area. Hence, larger electrostatic attractive forces than in the case where the first area 9b is not provided are obtained, and as a result, compactness and low-voltage drive of the unit becomes possible. However, where an electrostatic attractive force is exerted with respect to only the sheet-like member 5 or only the beam portion 4b, a corresponding operation can be performed, and thus the present invention is not limited to the above construction.

Subsequently, a description is given of the manufacturing process of the first substrate 1 in reference to FIGS. 4A and 4B. FIG. 4A shows sections taken along line A—A in FIG. 3A, and FIG. 4B shows sections taken along line B—B in FIG. 3A. An n-type diffused layer is formed in an area corresponding to the sheet-like member 5 with respect to a p-type silicon substrate with a thickness of 300 μm, on each surface of which is deposited a silicon nitride film with a thickness of 400 nm. After that, of the silicon nitride film deposited on the reverse side of the silicon substrate (on the lower side in the figure), the film in an area corresponding to the opening 3a of the frame member 3 is removed. The contact holes 6a are made in the silicon nitride film deposited on the upper side. The cross section of the silicon substrate thus obtained is shown in (1) of FIG. 4A.

A polycrystalline silicon layer with a thickness of 800 nm is then formed on the upper side by a low-pressure chemical vapor deposition (LPCVD) process, and a lithography technique is used for patterning of such a profile that the four beam members 4 are available, as shown in FIG. 3A. The cross section of the silicon substrate thus obtained is shown in (2) of FIG. 4A. An aluminum film is deposited on the upper side of the n-type diffused layer by a process, such as sputtering, to construct the mirror 7. The cross section of the silicon substrate thus obtained is shown in (3) of FIG. 4A.

Subsequently, after a surface protecting film of an alkali-resisting substance is formed on the right side, electrochemical etching takes place in a strong alkaline solution in a state where a positive voltage is applied to the n-type diffused layer (it is only necessary to apply the voltage to the polycrystalline silicon electrically conducted to the n-type diffused layer), and the p-type silicon substrate is removed from the reverse side. In this case, however, the silicon nitride film deposited on the reverse side functions as a mask in an area corresponding to the frame member 3, and therefore etching takes place only in an area in which the silicon nitride film is not provided. In an area in which the n-type diffused layer is formed, the etching stops in the proximity of an interface, and in a remaining area, it stops at a stage in which the silicon nitride film on the right side is exposed. The cross section of the silicon substrate at this stage is shown in (4) of FIG. 4A. After that, the surface protecting film is removed, and the silicon nitride films on the right and reverse sides, exposed on the reverse side, are removed by reactive ion etching. In this way, the first substrate 1 of the cross section shown in (5) of FIG. 4A is obtained.

According to the above-mentioned manufacturing method, the semiconductor manufacturing technique can be used throughout the whole process. This is entirely favorable for low-cost fabrication of the first substrate 1 which is minute. Moreover, since the sheet-like member 5 can be made by the electrochemical etching of single-crystal silicon, it becomes possible to provide a planar mirror which is lower in internal stress, higher in flatness, and higher in accuracy than the case where a thin film is formed on a preset substrate. Also, although, in the above description of the manufacturing process, only the first substrate 1 is illustrated, it is needless to say that, actually, a large number of first substrates 1 are fabricated simultaneously on a single silicon substrate.

Second Embodiment

Figure 5:
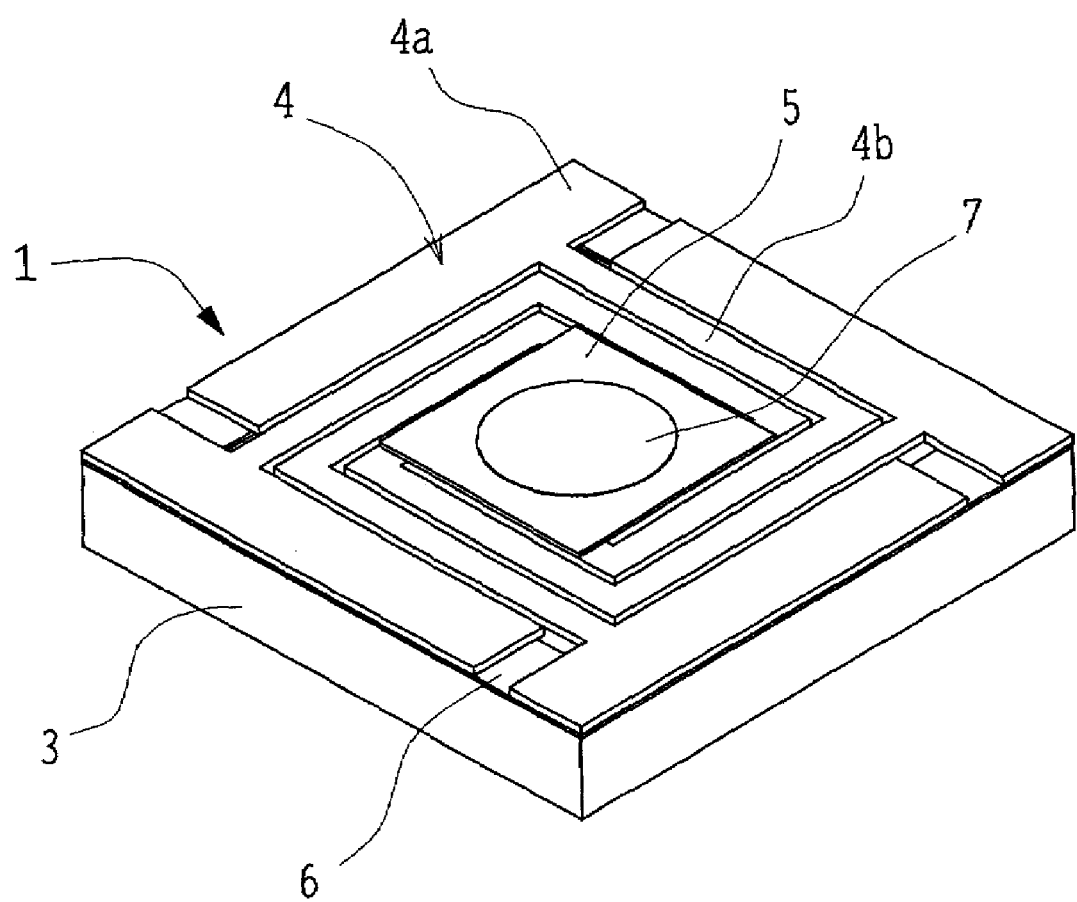
FIG. 5 is a perspective view showing the first substrate in a second embodiment of the present invention.

This embodiment has the same structure as the first embodiment with the exception of a part of the first substrate 1 in the first embodiment. Therefore, only the first substrate 1 of the second embodiment is shown in FIG. 5 as in FIG. 2A. The sheet-like member 5, unlike the case of the first embodiment, is made of the same polycrystalline silicon as in the beam members 4. In this case, when the sheet-like member 5 is constructed to have the same thickness as each of the beam members 4, which is deflected by the electrostatic attractive force, the sheet-like member 5 is also deflected. The sheet-like member 5 thus has a larger thickness on the right side than each beam member 4.

In the structure of the second embodiment mentioned above, a small strain is caused to the sheet-like member 5 by the internal stress of the polycrystalline silicon. However, since it is possible to provide the contact holes 6a as in the first embodiment and to eliminate the process of forming the n-type diffused layer, this construction is favorable for the case where surface accuracy is not so required for the specification and is extremely advantageous for cost.

In the second embodiment also, the terms "beam member" and "sheet-like member" are used, but as will be seen from the above description, it can be said that each of the terms expresses a different part of one member which is the first electrode. The same holds for the case of each of the embodiments and modified examples which are described below.

Third Embodiment

Figure 6A:
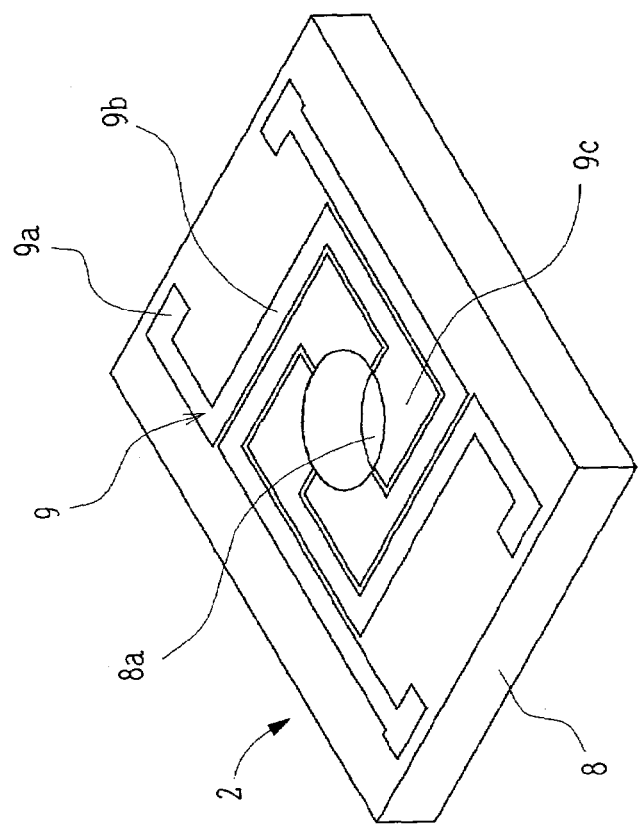
FIG. 6A is a perspective view showing the first substrate in a third embodiment of the present invention.
Figure 6B:
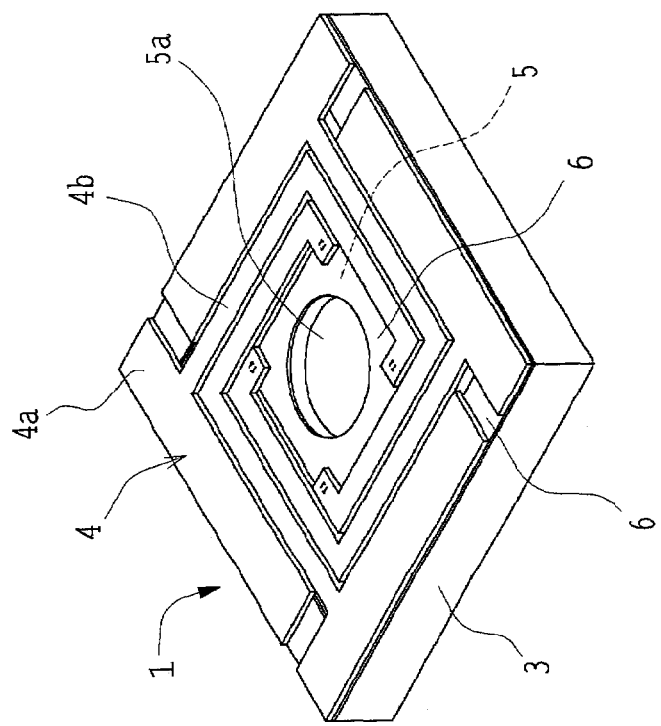
FIG. 6B is a perspective view showing the second substrate in the third embodiment.

This embodiment is show in FIGS. 6A and 6B. FIG. 6A shows the first substrate 1 of the second embodiment as in FIG. 2A, and FIG. 6B shows the second substrate 2 of the second embodiment as in FIG. 2C. The second embodiment has fundamentally the same structure as the first embodiment with the exception that circular through holes 5a and 8a are provided at the middles of the sheet-like member 5 and the base member 8 opposite thereto, respectively. Thus, in the case where the semiconductor manufacturing technique is used to fabricate the first substrate 1, it is only necessary that the n-type diffused layer is not formed in an area corresponding to the through hole 5a in the manufacturing process described in the first embodiment.

The structure of the third embodiment is suitable for mounting of a transmission type optical element, and an optical element, not shown, such as a lens, a transmission type diffraction grating, or a pinhole plate, is mounted, by means of cementation, in the through hole 5a of the sheet-like member5. The through-hole 5a, therefore, need not necessarily be circular. In the third embodiment, the base member 8 is also provided with the through hole 8a of the same shape as the through hole 5a, but their shapes and sizes may not be identical. Moreover, where the base member 8 is made of a transparent material, there is no need to provide the through hole 8a. In the third embodiment constructed as mentioned above, its operation is performed as in the first embodiment.

Fourth Embodiment

With reference to FIGS. 7A–7C, this embodiment is explained. The forth embodiment, like the third embodiment, has a structure suitable for mounting of the transmission type optical element. FIG. 7A shows the first substrate 1, FIG. 7B shows the second substrate 2, and FIG. 7C shows a third substrate 11. The first substrate 1 of the fourth embodiment is the same as the first substrate 1 of the third embodiment (see FIG. 6A) with the exception that an insulating spacer member 12 is provided on each of the leading wire portions 4a of the four beam members 4, but the second substrate is entirely the same as that of the third embodiment. The third substrate 11 is symmetrically constructed with respect to the second substrate 2 so that a base member 13 is provided with a through hole 13a and each of four fixed electrode members 14 as a third electrode includes a leading wire portion 14a, a first area 14b, and a second area 14c. The third substrate 11 is cemented to the spacer members 12, with its electrode face on the side of the first substrate 1.

In the fourth embodiment, as described above, the first substrate 1 is sandwiched between the second substrate 2 and the third substrate 11 so that voltage control relating to a total of eight fixed electrodes can be made individually. Consequently, the first substrate 1 has the feature that the sheet-like member 5 can be displaced on both sides of the second substrate 2 and the third substrate 11 and a larger amount of displacement than in the third embodiment is obtained. In the third embodiment, when the sheet-like member 5 is tilted, the center position of the through hole 5a is shifted and a distance with the center position of the through hole 8a is changed. In the fourth embodiment, however, the sheet-like member 5 can be tilted without changing the center position of the sheet-like member 5. In the fourth embodiment, therefore, the number of degrees of control freedom is much larger than in the third embodiment. It is needless to say that the placement of the third substrate 11 described above is possible in the structure of each of other embodiments, as well as of the third embodiment.

Fifth Embodiment

Figure 8:
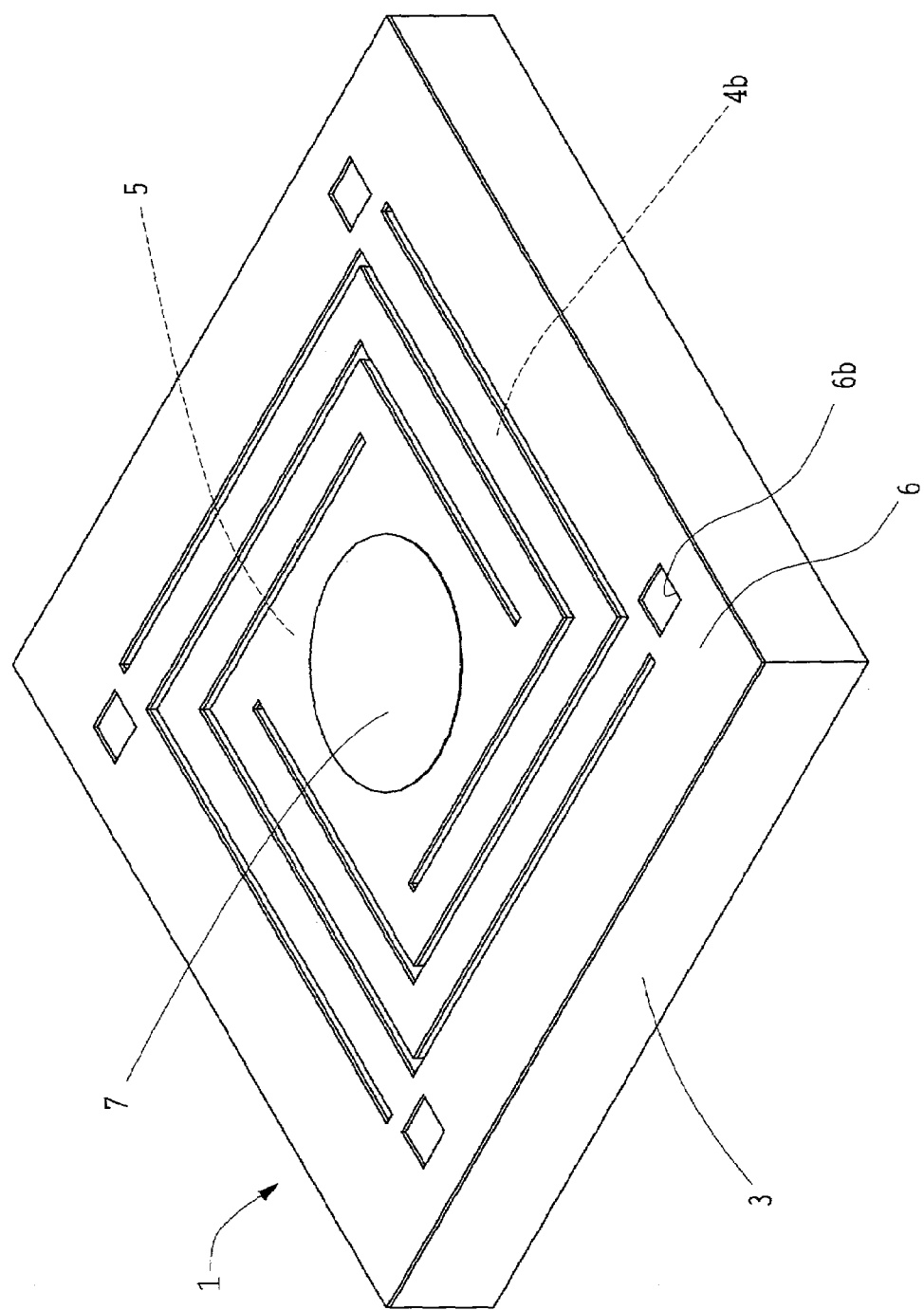
FIG. 8 is a perspective view showing the first substrate in a fifth embodiment of the present invention.

The first embodiment is constructed so that the frame member 3 and sheet-like member 5 of single-crystal silicon are connected to the beam members 4 of polycrystalline silicon. However, in the fifth embodiment, as shown in FIG. 8, all these members are made of single-crystal silicon, the silicon nitride film 6 is provided with opening 6b in the proximity of the connections of the frame member 3 with the four beam portions 4b, and an aluminum film is deposited on the exposed surface of the beam member 3, thereby providing leading wire portions.

The manufacturing process of the fifth embodiment is described with reference to FIG. 9. A deep n-type diffused layer is first formed in an area corresponding to the sheet-like member 5 on a p-type silicon substrate with a thickness of 300 μm and shallow n-type diffused layers are formed in areas corresponding to the beam portions 4b of the beam members 4 so that a silicon nitride film with a thickness of 400 nm is deposited on each surface of the substrate. After that, of the silicon nitride film deposited on the reverse side of the substrate (on the lower side in the figure), the film in an area corresponding to the opening 3a of the frame member 3 is removed. In the connections of the frame member with the beam portions 4b, since the shallow n-type diffused layers extend to the frame member 3, the four openings 6b are provided to the silicon nitride film 6 on the right side which covers an extending area, by photolithography, to expose parts of the frame member 3. In addition, aluminum films are deposited, by sputtering and photolithography, on the silicon nitride film on the upper surface of the deep n-type diffused layer and the four exposed portions of the frame member 3 to provide the mirror 7 and the leading wire portions. The cross section of the silicon substrate in this case is shown in (1) of FIG. 9.

Subsequently, the surface protecting film of an alkali-resisting substance is formed on the right side, and the p-type silicon substrate is etched from the reverse side in a strong alkaline solution in a state where a positive voltage is applied to the n-type diffused layer. However, since the silicon nitride film is deposited on the reverse side in an area corresponding to the frame member 3, etching takes place only in an area in which the silicon nitride film is not provided. In an area in which the n-type diffused layer is formed, the etching stops in the proximity of an interface, and in a remaining area, it stops at a stage in which the silicon nitride film on the right side is exposed. The cross section of the silicon substrate in this state is shown in (2) of FIG. 9. After that, the surface protecting film is removed, and the silicon nitride films on the right and reverse sides, exposed on the reverse side, are removed by reactive ion etching. In this way, the cross section of the silicon substrate is shown in (3) of FIG. 9 and the first substrate 1 of the fifth embodiment is obtained.

Also, strictly speaking, the thickness of residual single-crystal silicon in the above etching process ranges not to the interface of the n-type diffused layer, but to an area close to the end of a depletion layer extended therefrom by the application of a bias voltage. Thus, prior to the formation of the n-type diffused layer, when a p-type impurity such as boron is diffused to increase the concentration, the thickness of each beam portion 4b can be made much smaller.

In practical use, in order to thin the beam portions 4b and reduce the spring constant, the use of polycrystalline silicon is preferable which allows the beam portion 4b as thin as 1 μm to be easily formed. However, when the silicon substrate is constructed as in the fifth embodiment, the forming process of polycrystalline silicon such as that of the first embodiment can be eliminated, depending on the specification, and cost advantages are derived accordingly. When the four beam portions 4b are formed of single-crystal silicon as in the fifth embodiment, a breaking strength becomes higher than in the case of polycrystalline silicon. This is advantageous for the case of the displacement of the sheet-like member 5 which has a relatively large area or to which a relatively heavy optical element is mounted.

Figure 10C:
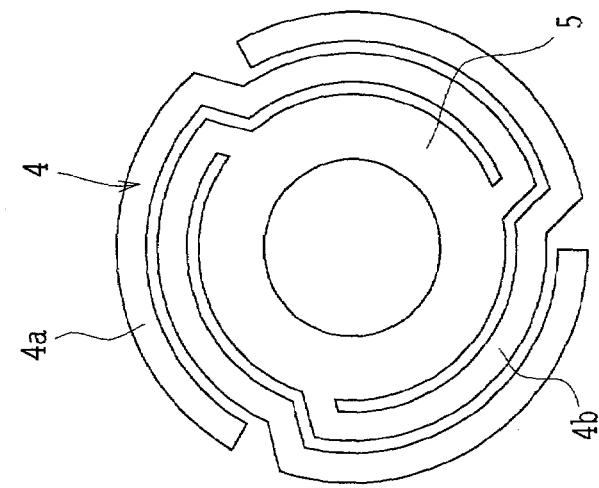
FIG. 10C is a plan view showing essential parts in a third modified example of the first substrate.
Figure 10B:
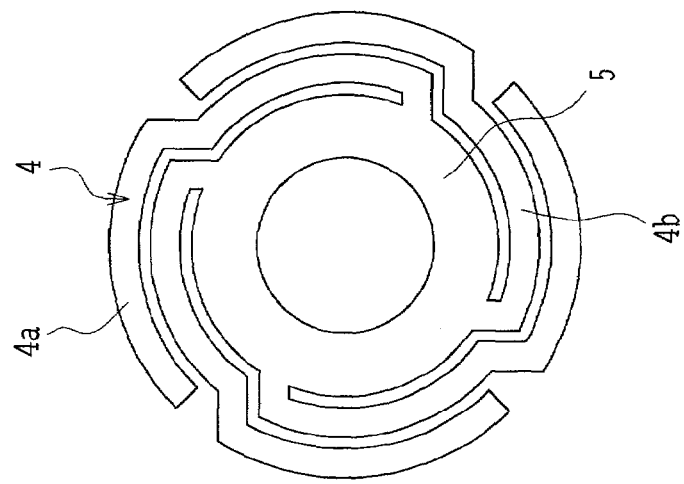
FIG. 10B is a plan view showing essential parts in a second modified example of the first substrate.
Figure 10A:
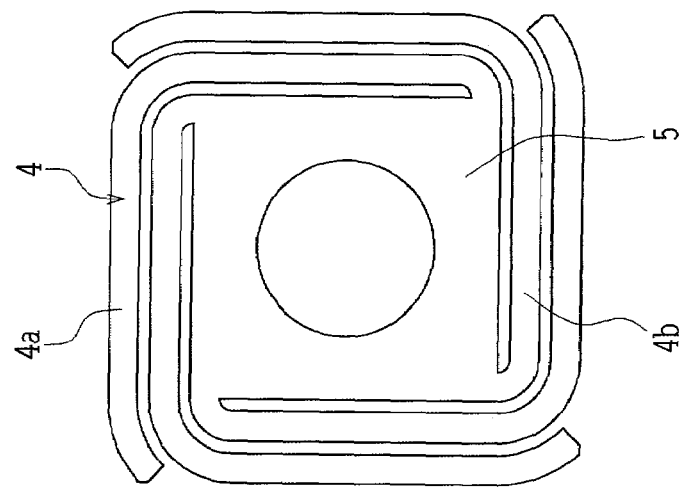
FIG. 10A is a plan view showing essential parts in a first modified example of the first substrate.

Subsequently, reference is made to modified examples of the first substrate 1 shown in the above embodiments, using FIGS. 10A–10C. However, the structure of the first substrate 1 in the embodiments has already been described in detail. In FIGS. 10A–10C, therefore, only three patterns of the first layer electrode made up of the beam portions 4 and the sheet-like member 5 are shown. In FIG. 10A, each of the four corners of the electrode is shape into an arc form. By doing so, stress concentration is obviated at the four corners, and thus manufacturing advantages are obtained. The pattern shown in FIG. 10B is advantageous for the case where the first substrate 1 is configured as a circle. In FIG. 10C, three beam portions 4 are provided. In the present invention, as mentioned above, it is only necessary to provide a plurality of crank- or curve-shaped beam portions 4, and their number is not limited.

In the present invention, since various modified pattern are considered in accordance with required specifications, various profiles can be used as contours of optical units. In the above embodiments and modified examples, reference has been made to the case where the first layer electrode is not divided, but in the present invention, the first layer electrode, like the second layer electrode, may be divided into a plurality of segments. In this case also, the second layer electrode may or may not be divided. Also, although in the above embodiments reference has been made to the case where the semiconductor manufacturing technique is used for fabrication of the optical unit, the present invention is not limited to this case, and a part or all of the optical unit may be fabricated by other means. As such, the term "member" described in the claims is not limited to an independent part.

In the above embodiments, the manufacturing processes of the second substrate 2 and the third substrate 11 are not described. Thus, an example of the manufacturing processes is briefly described. An insulating film such as a silicon oxide film is first deposited on a p-type silicon substrate, and then an aluminum thin film is deposited on the upper surface of the insulating film by a process, such as sputtering, and is patterned by an ordinary photolithography technique to make an electrode. In such fabrication, generally as in the first substrate 1, a large number of chips are formed simultaneously on a large silicon wafer and are individually divided by dicing. In the case where the through hole 8a such as that shown in FIG. 6B is provided, it is made before the dicing by anisotropic etching such as RIE (reactive ion etching), or excimer laser application.

Sixth Embodiment

Figure 11A:
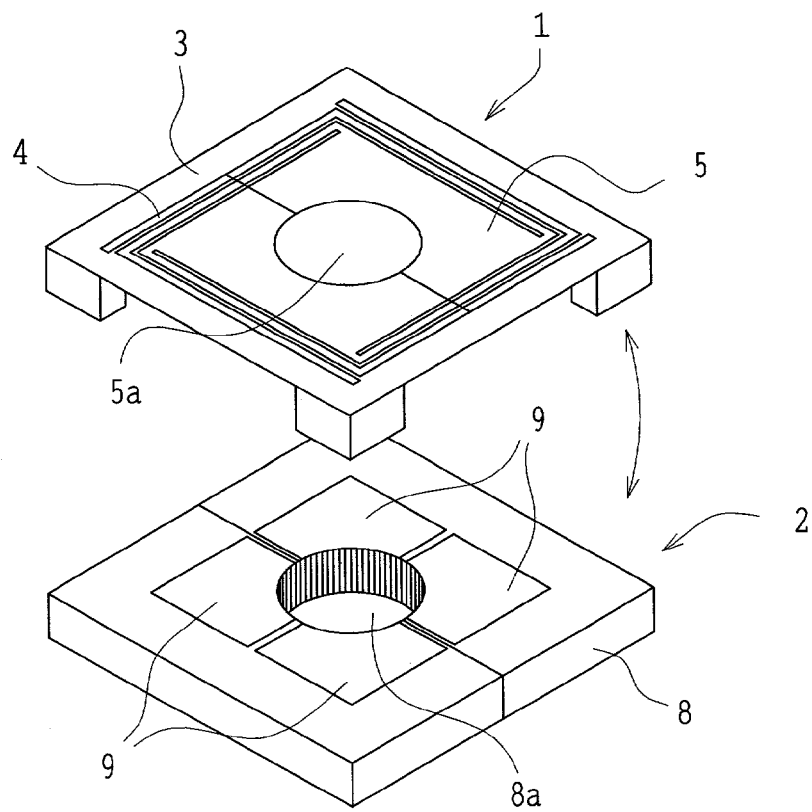
FIG. 11A is an exploded view showing a sixth embodiment of the present invention.
Figure 11B:
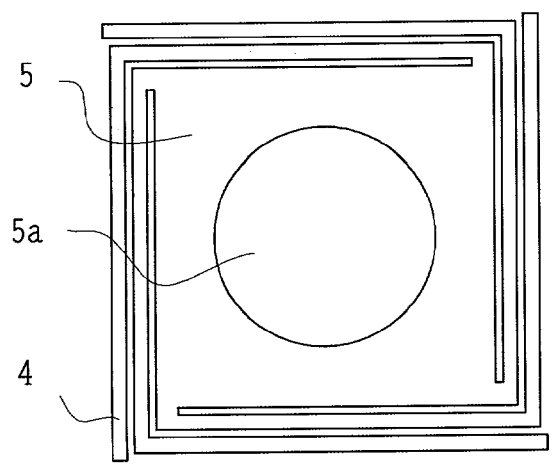
FIG. 11B is a plan view showing a plate spring of the first substrate in the sixth embodiment.
Figure 11C:
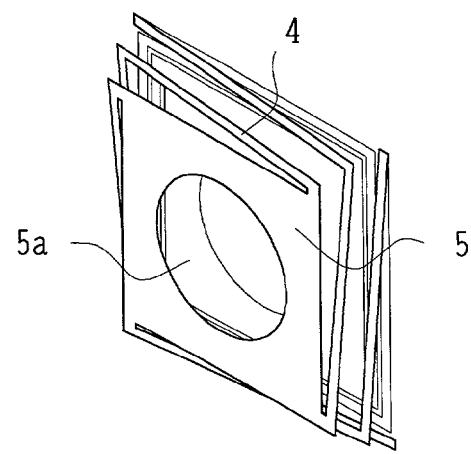
FIG. 11C is a perspective view showing the deformation of the plate spring in FIG. 11B.

FIGS. 11A–11C show the sixth embodiment. FIG. 11 is an exploded perspective view, FIG. 11B is a plan view of a plate spring, and FIG. 11C shows the deformation of the plate spring.

The first substrate 1 includes the frame member 3, the sheet-like member 5, and the four crank-shaped beam members 4 connecting these members 3 and 5. The sheet-like member 5 and the beam members 4 are made of conductive substances and constitute a moving electrode. The beam members 4 are connected to the four corners of the sheet-like member 5, each having the shape of a crank so as to surround the sheet-like member 5. Since their occupied area is thus small and the length of the beam can be increased, a small spring constant is obtained and the sheet-like member 5, for example, as shown in FIG. 11C, can be displaced by a less electrostatic force. Each of the beam members 4 has the shape of the letter "L", but as already mentioned, may be configured into the shape of the letter "U" or an arc shape.

In the second substrate 2, as shown in FIG. 11A, the fixed electrode members 9 divided into four are provided. E ach of the electrode members 9 has an area corresponding to each beam member 4, located directly below it, and an area corresponding to the sheet-like member 5, located directly below it.

When the moving electrode is grounded and a high voltage is applied to a desired electrode 9 in the second substrate 2, electrostatic attractive forces are exerted between the electrode member 9 and a part of the sheet-like member 5 corresponding to the electrode member 9 and the beam member 4 connected thereto. Here, when the other three electrodes of the second substrate 2 are grounded, the electrostatic attractive force is not exerted in the remaining area of the first substrate 1 and thus the sheet-like member 5 is attracted to the side of the second substrate 2 in the above area and tilts toward the second substrate 2. At the same time, a distance between the sheet-like member 5 and the second substrate 2 is reduced at the center of the sheet-like member 5.

When the first substrate 1 is grounded and identical voltages are applied to the four electrodes 9 of the second substrate 2, identical electrostatic attractive forces are exerted with respect to the sheet-like member 5 and the four beam members 4, and hence the sheet-like member 5 is moved in parallel toward the second substrate 2.

Thus, in the sixth embodiment, the voltages applied to the four electrodes 9 are controlled and thereby the tilt and vertical displacement of the sheet-like member 5 can be controlled at will.

Consequently, when an optical element such as a lens is mounted in the through hole 5a of the substrate 1, the optical element is displaced and various conditions, such as the focal length, of light passing through the through holes 5a and 8a can be changed. The sheet-like member 5 of the substrate 1 is also used as an optical element support in an embodiment to be described later.

The plate spring actuator used in the present invention, as mentioned above, includes a substrate having at least one fixed electrode and another substrate having at least one moving plate-spring-like electrode (moving electrode). Also, although the sixth embodiment is provided with the substrate 1 having the moving electrode and the substrate 2 having the fixed electrodes, the embodiment may be constructed so that the substrate having the moving electrode is sandwiched between two substrates having the fixed electrodes, and the number of individual substrates is not limited.

Instead of using the electrostatic forces, two electrodes may be replaced by coils, for example, thin film coils, so that the sheet-like member 5 is deformed by electromagnetic forces. By using one electrode as a permanent magnet and the other electrode as a coil, the plate spring actuator is constructed so that the sheet-like member 5 is deformed by the electromagnetic force. In such constructions, there is the merit that the direction of deformation can be changed only by altering the polarity of the current. Also, the present invention is described on the premise that the coil is equivalent to the electrode.

The structure such as a bimorph or unimorph made of a material having a piezoelectric effect (or an electrostriction effect) that extension and contraction are produced when the voltage is applied may be used for the plate spring portion of the plate spring actuator.

Such a drive is referred to as "a drive by the piezoelectric effect". The same effect as in the plate spring actuator driven by the electrostatic force or the electromagnetic force is obtained.

Seventh Embodiment

Figure 12:
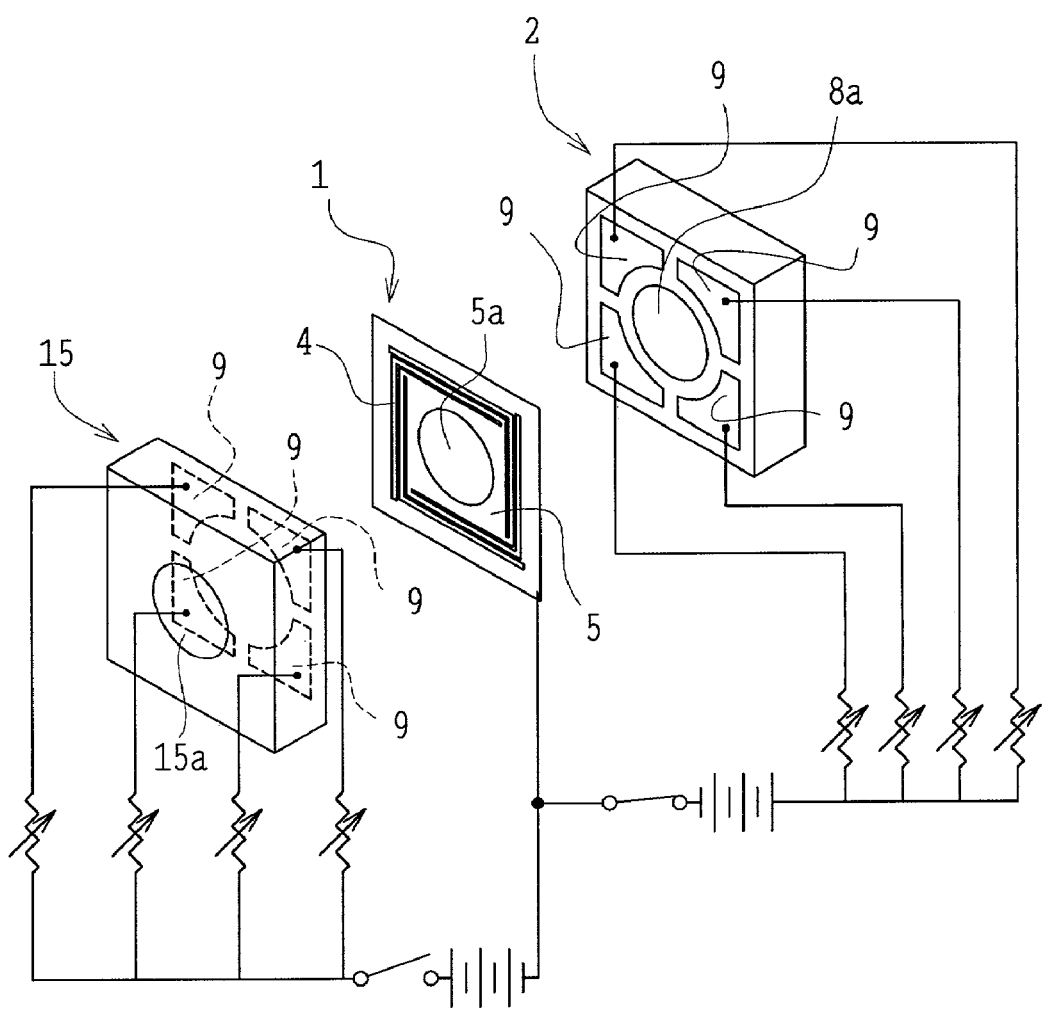
FIG. 12 is a schematic view showing a seventh embodiment of the present invention.

FIG. 12 shows a schematic construction of the seventh embodiment. The optical unit of this embodiment is such that when the voltage is applied between the first substrate 1 and the second substrate 2, the sheet-like member (optical element support) 5 is moved to the right of the figure (toward the second substrate 2), while when the voltage is applied between a third substrate 15 and the first substrate 1, the optical element support 5 is moved to the left of the figure (toward the substrate 15).

According to the seventh embodiment, therefore, the stroke of the optical element support 5 can be doubled by the substrate 1 having a single moving plate-spring-like electrode 4. Alternatively, merely by applying a lower voltage, the same stroke as in the case where the optical element support 5 is moved in one direction can be obtained.

Also, the substrates 1, 2, and 15 are provided, at their middles, with through holes 5a, 8a, and 15a, respectively, in at least one of which is mounted a lens, mirror, or prism. Whereby, the optical unit can be used in various optical apparatuses, for example, a digital camera, a camera, an endoscope, a TV camera, a telescope, an illumination optical system, binoculars, and a finder, and for zoom of an optical pick-up device, a magnification change, focusing, shake prevention, and compensation for degradation of imaging performance.

Eighth Embodiment

Figure 13:
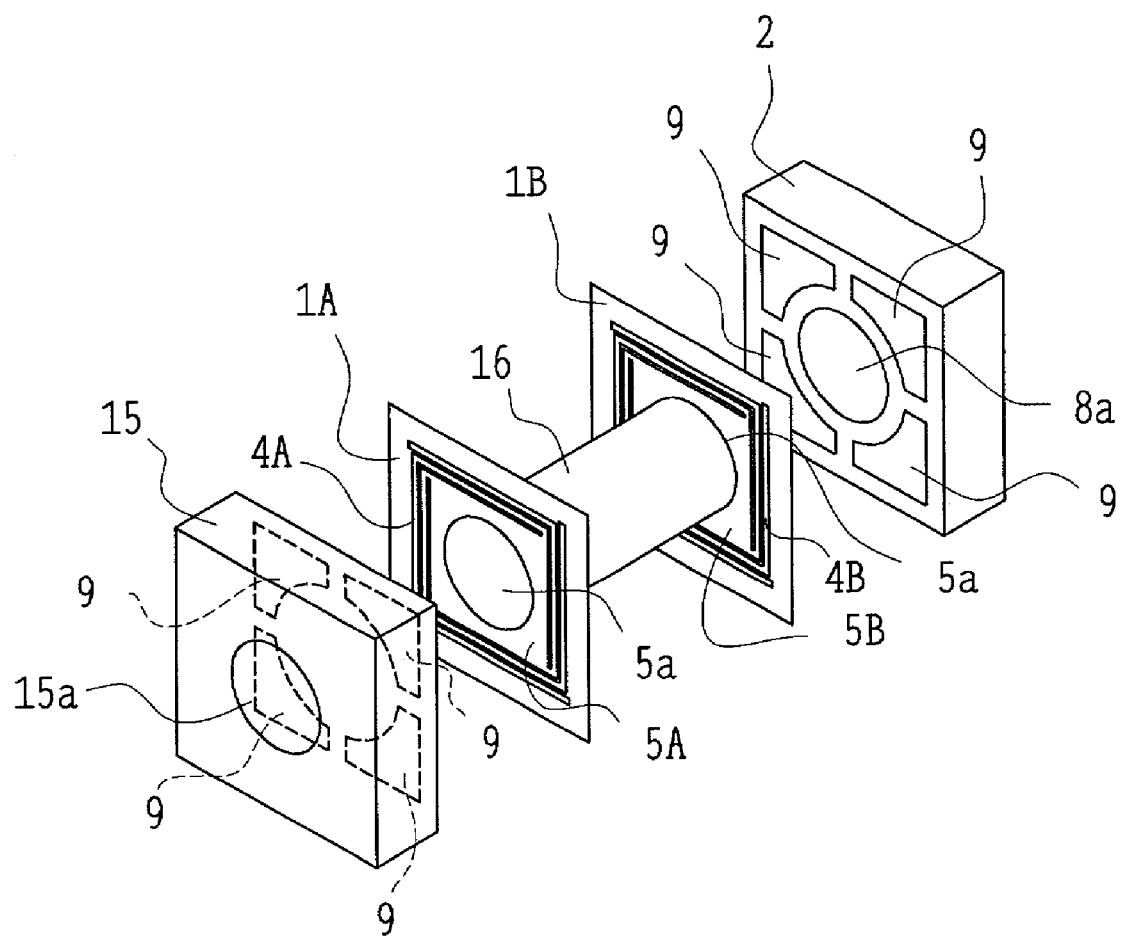
FIG. 13 is a schematic view showing an eighth embodiment of the present invention.

FIG. 13 shows a schematic construction of the eighth embodiment. The optical unit of this embodiment is constructed so that two sets of plate spring actuators, each having a substrate with fixed electrodes and another substrate with a moving plate-spring-like electrode, are arranged so that substrates with moving plate-spring-like electrodes are opposite to each other, and an optical system is provided in through holes provided at the middles of these moving plate-spring-like electrodes.

Specifically, a plate spring actuator including the substrate 15 with the fixed electrodes 9 and a substrate 1A with a moving plate-spring-like beam member (moving electrode) 4A and another plate spring actuator including the substrate 2 with the fixed electrodes 9 and a substrate 1B with a moving plate-spring-like beam member (moving electrode) 4B are arranged so that the substrates 1A and 1B with moving electrodes are opposite to each other.

At the middles of individual substrates, the through holes 15a, 5a, 5a, and 8a are provided. Both ends of an optical system 16 are inserted in the through holes 5a of the substrates 1A and 1B with moving electrodes.

Since electric forces (voltages or currents) which are reversed in direction are applied between the substrates 15 and 1A and between the substrates 2 and 1B and these substrates are arranged opposite to each other, the substrates 1A and 1B with moving electrodes are moved in the same direction.

According to the eighth embodiment constructed as mentioned above, the optical system 16 is moved by a force twice that of an ordinary plate spring actuator. Thus, the tolerance of mass of a movable optical system becomes wide, and the number of degrees of optical design freedom can be increased.

The optical system may be constructed with a plurality of optical elements, such as lenses and lens mirrors, or a single optical element of great mass.

Alternatively, the optical system may be designed so that, by applying the construction of the eighth embodiment, at least three sets of plate spring actuators, each having a substrate with fixed electrodes and another substrate with a moving platespring-like electrode, are used to move the optical element.

Ninth Embodiment

Figure 14:
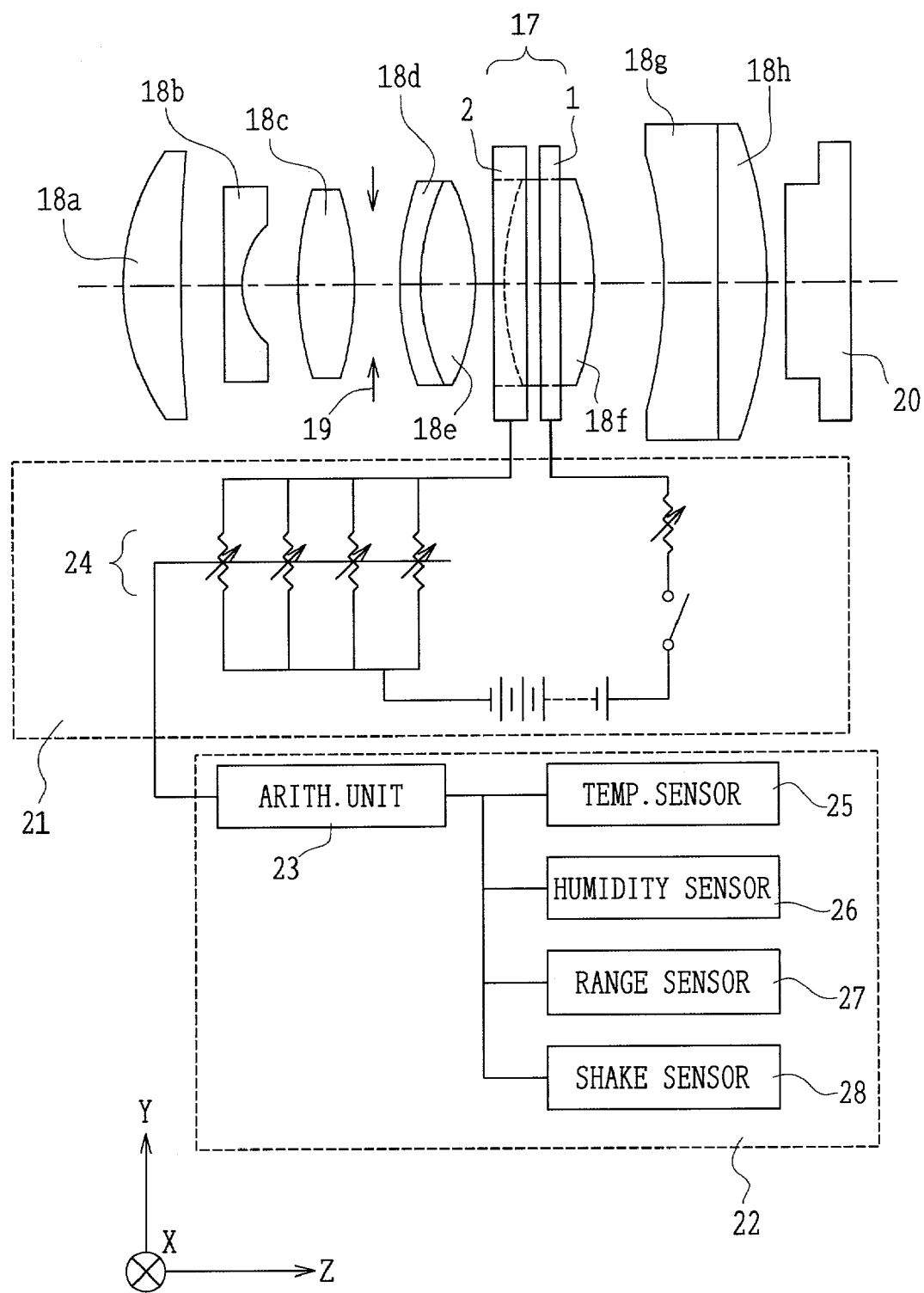
FIG. 14 is a schematic view showing a ninth embodiment of the present invention.

FIG. 14 shows a schematic construction of the ninth embodiment. The optical unit of this embodiment is constructed as an imaging optical system including a plate spring actuator 17 which has a substrate with fixed electrodes and a substrate with a moving plate-spring-like electrode.

The ninth embodiment is constructed with lenses 18a–18e; the substrate 1 having plate-spring-like electrodes and the substrate 2 having fixed electrodes, constituting the plate spring actuator 17; a lens 18f fixed to a through hole provided to the optical element support of the substrate 1; and lenses 18g and 18h. Reference numeral 19 denotes a stop and 20 denotes a solid-state image sensor.

Electronic circuitry including a driving circuit 21 and a control circuit 22 is connected to the plate spring actuator 17, and is designed so that identical or different electric forces (voltage or currents) are applied to the electrodes divided into four in each of the substrates 1 and 2 constituting the plate spring actuator 17, and thereby the position and tilt of the lens 18f can be changed.

Also, in FIG. 14, reference numeral 23 represents an arithmetical unit for controlling a plurality of resistances provided in variable resistors 24, and 25, 26, 27, and 28 represent a temperature sensor, a humidity sensor, a range sensor, and a shake sensor, respectively, connected to the arithmetical unit 23.

The position and tilt of the lens 18f are controlled by changing the resistance values of the variable resistors 24 through signals from the arithmetical unit 23 so that imaging performance is optimized. Specifically, signals of magnitudes according to ambient temperature and humidity, an object distance, and the amount of shake are input into the arithmetical unit 23 from the temperature sensor 25, the humidity sensor 26, the range sensor 27, and the shake sensor 28. In order to compensate the degradation of imaging performance caused by the ambient temperature and humidity, the object distance, and the shake in accordance with these input signals, the arithmetical unit 23 outputs signals for determining the resistance values of the variable resistors 24 so that preset voltages for determining the position and tilt of the lens 18ƒ are applied to the fixed electrodes 9 (see FIG. 12).

In this way, the optical element support 5 (see FIG. 12) of the substrate 1 is deformed by the voltages, namely the electrostatic forces, applied to the fixed electrodes 9, and its position and tilt are variously controlled in accordance with the situation.

Also, the range sensor can be eliminated. In this case, when the position of the lens 18ƒ in a Z direction is somewhat shifted and the position and tilt of the lens 18ƒ are determined so that the high-frequency component of an image signal from the solid-state image sensor is nearly maximized, focusing can be performed.

The shake sensor 28 is adapted to change the voltages applied to the four electrodes 9 provided on the substrate 2 through the arithmetical unit 23 and the variable resistors 24, for example, in order to deform the optical element support 5 having the moving plate-spring-like electrodes so that the shake caused in photographing of a digital camera is detected and the disturbance of an image raised by the shake is compensated. In this case, signals from the temperature sensor 25, the humidity sensor 26, and the range sensor 27 are taken into account at the same time, and compensation for focusing, temperature, and humidity is made.

Also, the temperature sensor 25, the humidity sensor 26, the range sensor 27, and the shake sensor 28 need not necessarily be provided, and, for example, a user may adjust the variable resistors 24 manually to perform focusing and optimize imaging performance.

The ninth embodiment constructed as described above can be used in a digital camera, a film camera (in this case, the solid-state image sensor 20 is replaced by a film), and an electronic endoscope.

When the solid-state image sensor 20 is replaced with a light-receiving element, the optical unit of the embodiment can also be used in a disk pick-up optical system.

In the ninth embodiment, the plate spring actuator 17 for adjusting the position and tilt of the lens 18ƒ may be replaced by the plate spring actuator, such as that shown in FIG. 12, constructed with the two substrates 2 and 15 having the fixed electrodes and the substrate 1 having the moving plate-spring-like electrodes, interposed between them. Alternatively, the plate spring actuator 17 may be replaced with the plate spring actuator, such as that shown in FIG. 13, using two sets of substrates in a pair and constructed so that a pair of optical element supports 5A and 5B are arranged opposite to each other.

Tenth Embodiment

Figure 15:
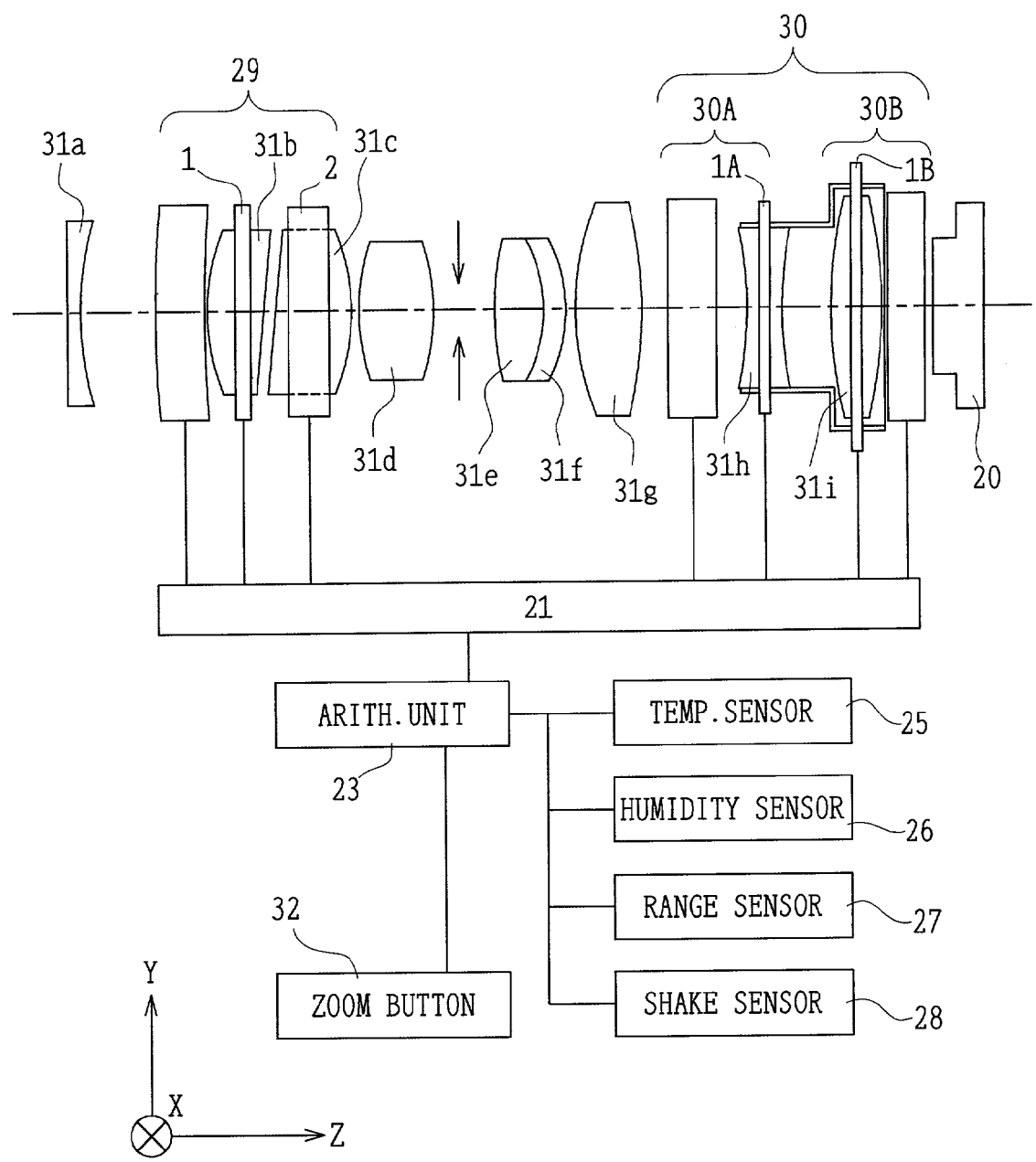
FIG. 15 is a schematic view showing a tenth embodiment of the present invention.

FIG. 15 shows a schematic construction of the tenth embodiment. In this embodiment, a plurality of plate spring actuators are used to construct the optical unit. Specifically, two types of plate spring actuators 29 and 30 are arranged in an optical system constituting an imaging device.

A lens 31b is mounted in a through hole provided to the substrate 1 having the moving electrodes of the plate spring actuator 29, and a lens 31c is mounted in a through hole provided to the substrate 2 having the fixed electrodes.

The plate spring actuator 30 is constructed with two sets of plate spring actuators 30A and 30B, such as those shown in FIG. 13, and lenses 31h and 31i are mounted, through a lens barrel, in the through holes 5a (see FIG. 13) provided to the substrates 1A and 1B opposite to each other. In the figure, reference numerals 31a, 31d, 31e, 31ƒ, and 31g represent lenses.

According to the tenth embodiment, the plate spring actuators 29 and 30 are used to thereby displace the lens 31b or the lenses 31h and 31i, and zoom and a change of magnification can be achieved.

In the tenth embodiment also, almost the same electronic circuitry as in the ninth embodiment of FIG. 14 is connected to individual plate spring actuators so that focusing, shake prevention, compensation for temperature and humidity changes, and correction for assembly errors can be achieved simultaneously.

The optical unit of the tenth embodiment, as in the embodiment of FIG. 14, can be used in a digital camera, a film camera, an electronic endoscope, and a disk pick-up optical system.

In order to facilitate compensation for shake, the tenth embodiment uses lenses 31b and 31c as decentering lenses so that compensation for shake can be made merely by moving the lens 31b along the optical system (in the Z direction of the figure).

In FIG. 15, reference numeral 32 designates a zoom indicating button. When the user pushes this button, the lenses mounted to the plate spring actuators 30A and 30B are moved in a preset direction so that zooming of a photographic lens system is performed.

Other circuit configurations are almost the same as in the embodiment of FIG. 14.

Eleventh Embodiment

Figure 16:
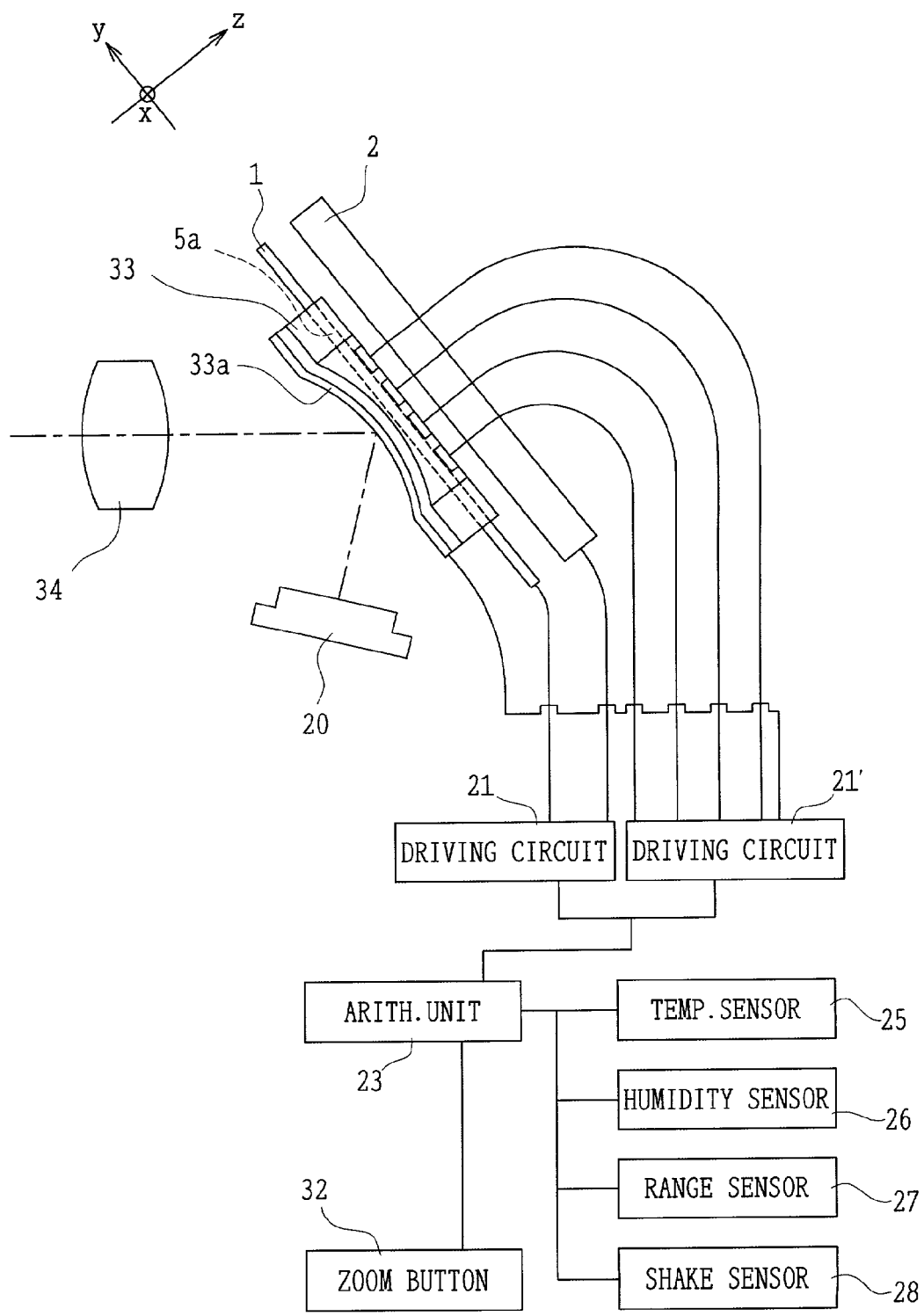
FIG. 16 is a schematic view showing an eleventh embodiment of the present invention.

FIG. 16 shows a schematic construction of the eleventh embodiment. This embodiment has the plate spring actuator constructed with the substrate 2 having the fixed electrodes and the substrate 1 having the moving plate-spring-like electrodes. A deformable mirror 33 with a reflecting surface 33a is mounted in the through hole 5a provided to the substrate 1. In FIG. 16, the optical unit of the eleventh embodiment is provided with a photographic lens 34 and the solid-state image sensor 20 to thereby construct an imaging device.

In the figure, reference numeral 21' represents a driving circuit of the deformable mirror 33. The driving circuit 21' is adapted to control electric forces (voltages or currents) applied to electrodes which are provided to the deformable mirror 33 so that the reflecting surface 33a can be arbitrarily deformed.

The optical unit of the eleventh embodiment is such that correction for aberrations produced by focusing, assembly errors, and manufacturing errors is chiefly made by deforming the reflecting surface 33a of the deformable mirror 33 itself, compensation for shake is made by changing the tilting angle of the deformable mirror 33 through the plate spring actuator, and zoom and compensation for focus shift involved in this zoom are achieved by changing the position of the deformable mirror 33 in the Z direction through the plate spring actuator. The deformable mirror can be used in examples to be described later. A variable focal-length mirror whose profile is not changed may be used. In the present invention, it is assumed that such a mirror comes into the category of the deformable mirror.

According to the optical unit of the eleventh embodiment, many functions, such as focusing, zooming, and shake prevention, can be performed by a single unit. The optical unit can also be utilized for an optical apparatus such as a telescope or binoculars.

In control for focusing and zooming, there is the merit that the control can be achieved by a well-known means. For example, the shift of the optical axis, decentering, and tilt of the photographic lens 34 caused by assembly errors are stored as initial values in a storage medium, such EEPROM, in terms of the amount of displacement of the optical element, and the amount of correcting displacement of the optical element from the temperature sensor 25, the humidity sensor 26, range sensor 27, and the shake sensor 28 in photographing is added and controlled by the well-known means. By doing so, the control for focusing and zooming can be achieved.

Twelfth Embodiment

Figure 17:
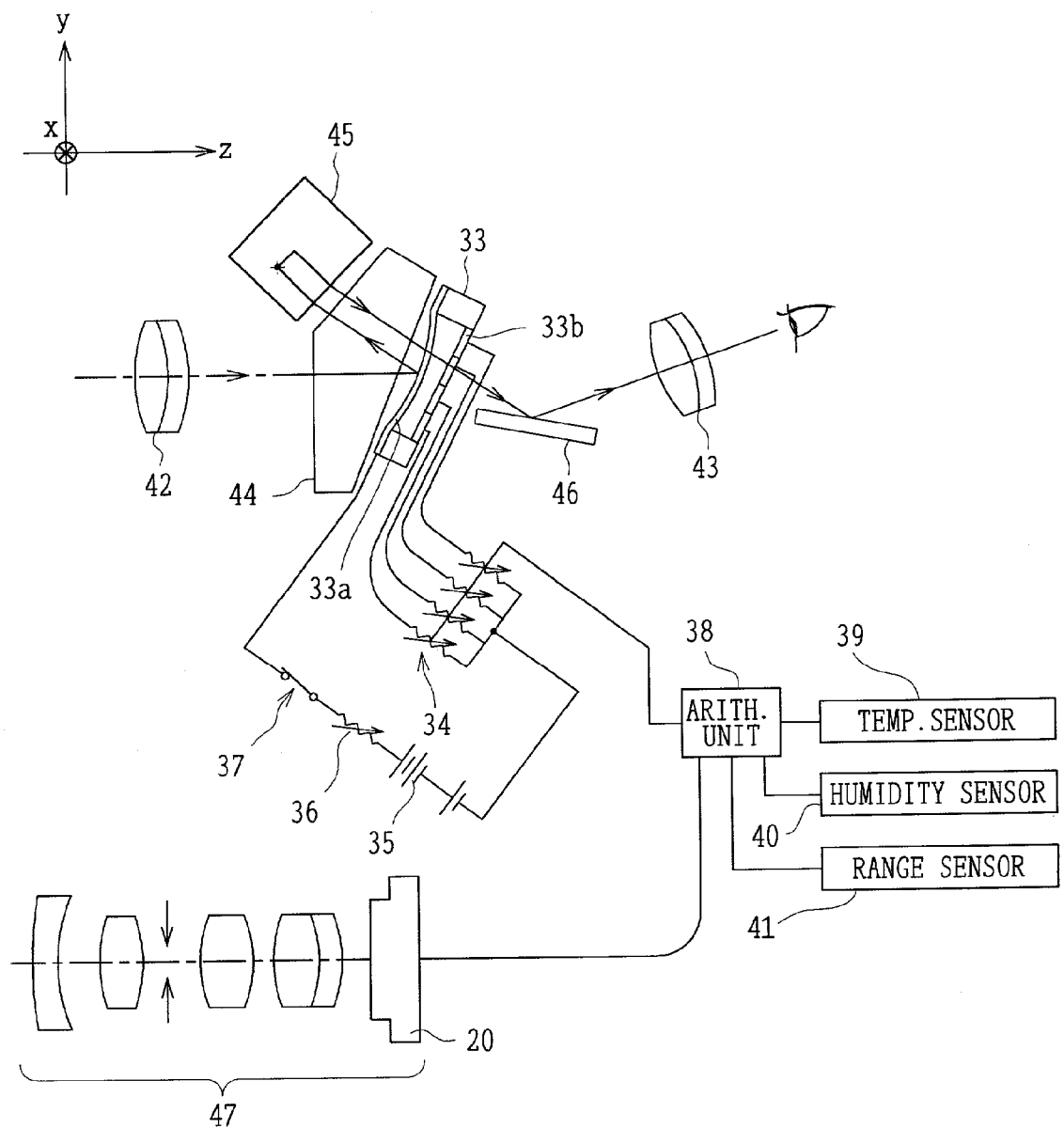
FIG. 17 is a schematic view showing a twelfth embodiment of the present invention.

FIG. 17 shows a schematic construction of a Keplerian finder for a digital camera using an optical-property mirror in the twelfth embodiment of the present invention. This embodiment can, of course, be used for a silver halide film camera.

Reference is first made to the optical-property deformable mirror 33. The optical-property deformable mirror 33 refers to a variable optical-property mirror (which is hereinafter simply called the deformable mirror) comprised of a thin film (reflecting surface) 33a coated with aluminum and a plurality of electrodes 33b. Reference numeral 34 denotes a plurality of variable resistors connected to the electrodes 33b; 35 denotes a power supply connected between the thin film 33a and the electrodes 33b through the variable resistors 34, a variable resistor 36, and a power switch 37; 38 denotes an arithmetical unit for controlling the resistance values of the variable resistors 34; and 39, 40, and 41 denote a temperature sensor, a humidity sensor, and a range sensor, respectively, connected to the arithmetical unit 38, which are arranged as shown in the figure to constitute one optical apparatus.

Each of the surfaces of an objective lens 42, an eyepiece 43, a prism 44, an isosceles rectangular prism 45, a mirror 46, and the reflecting surface 33a of the deformable mirror 33 need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

The thin film 33a, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187–190, 1997, is such that when voltages are applied across the plurality of electrodes 33b, the thin film 33a is deformed by an electrostatic force and its surface profile is changed. Whereby, not only can focusing be adjusted to the diopter of an observer, but also it is possible to suppress deformations and changes of refractive indices, caused by temperature and humidity changes of the lenses 42 and 43 and/or the prism 44, the isosceles rectangular prism 45, and the mirror 46, or the degradation of imaging performance by the expansion and deformation of a lens frame and assembly errors of parts, such as optical elements and frames. In this way, a focusing adjustment and correction for aberration produced by the focusing adjustment can be always properly made.

Figure 19:
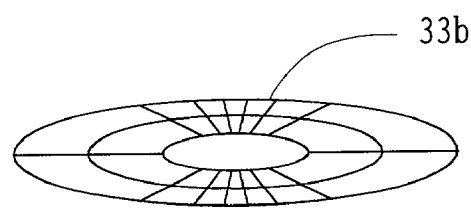
FIG. 19 is a view showing one example of an electrode used in the deformable mirror of FIG. 18.
Figure 20:
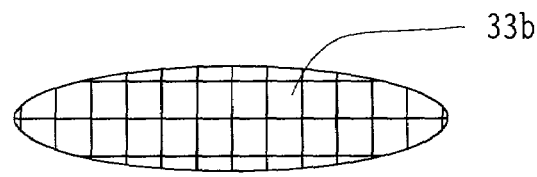
FIG. 20 is a view showing another example of the electrode used in the deformable mirror of FIG. 18.

Also, it is only necessary that the shape of the electrodes 33b, for example, as shown in FIGS. 19 and 20, is selected in accordance with the deformation of the thin film 33a.

According to the embodiment, light from an object is refracted by the entrance and exit surfaces of the objective lens 42 and the prism 44, and after being reflected by the deformable mirror 33, is transmitted through the prism 44. The light is further reflected by the isosceles rectangular prism 45 (in FIG. 17, a mark + on the optical path indicates that a ray of light travels toward the back side of the plane of the page), and is reflected by the mirror 46 to enter the eye through the eyepiece 43. As mentioned above, the lenses 42 and 43, the prisms 44 and 45, and the deformable mirror 33 constitute the observing optical system of the optical apparatus in the embodiment. The surface profile and thickness of each of these optical elements is optimized and thereby aberration of an object surface can be minimized.

Specifically, the configuration of the thin film 33a, as the reflecting surface, is controlled in such a way that the resistance values of the variable resistors 34 are changed by signals from the arithmetical unit 38 to optimize imaging performance. Signals corresponding to ambient temperature and humidity and a distance to the object are input into the arithmetical unit 38 from the temperature sensor 39, the humidity sensor 40, and the range sensor 41. In order to compensate for the degradation of imaging performance due to the ambient temperature and humidity and the distance to the object in accordance with these input signals, the arithmetical unit 38 outputs signals for determining the resistance values of the variable resistors 34 and 36 so that voltages by which the configuration of the thin film 33a is determined are applied to the electrodes 33b. Thus, since the thin film 33a is deformed with the voltages applied to the electrodes 33b, that is, the electrostatic force, it assumes various shapes including an aspherical surface, according to circumstances. The range sensor 41 need not necessarily be used, and in this case, it is only necessary that an imaging lens 47 of the digital camera is moved so that a high-frequency component of an image signal from a solid-state image sensor 20 is roughly maximized, and the object distance is calculated from this position so that an observer's eye is able to focus upon the object image by deforming the deformable mirror.

When the thin film 33a is made of synthetic resin, such as polyimide, it can be considerably deformed even at a low voltage, which is advantageous. Also, the prism 44 and the deformable mirror 33 can be integrally configured into a unit.

Although not shown in the figure, the solid-state image sensor 20 may be constructed integrally with the substrate of the deformable mirror 33 by a lithography process.

When each of the lenses 43 and 42, the prisms 44 and 45, and the mirror 46 is configured by a plastic mold, an arbitrary curved surface of a desired configuration can be easily obtained and its fabrication is simple. In this imaging device, the lenses 42 and 43 are arranged separately from the prism 44. However, if the prisms 44 and 45, the mirror 46, and the deformable mirror 33 are designed so that aberration can be eliminated without providing the lenses 42 and 43, the prisms 44 and 45 and the deformable mirror 33 will be configured as one optical block, and the assembly is facilitated. Parts or all of the lenses 42 and 43, the prisms 44 and 45, and the mirror 46 may be made of glass. By doing so, an imaging device with a higher degree of accuracy is obtained.

Also, although in FIG. 17 the arithmetical unit 38, the temperature sensor 39, the humidity sensor 40, and the range sensor 41 are provided so that the deformable mirror 33 compensates for the changes of the temperature, the humidity, and the object distance, the present invention is not limited to this construction. That is, the arithmetical unit 38, the temperature sensor 39, the humidity sensor 40, and the range sensor 41 may be eliminated so that the deformable mirror 33 compensates for only a change of an observer's diopter.

Subsequently, reference is made to other structures of the deformable mirror 33.

Figure 18:
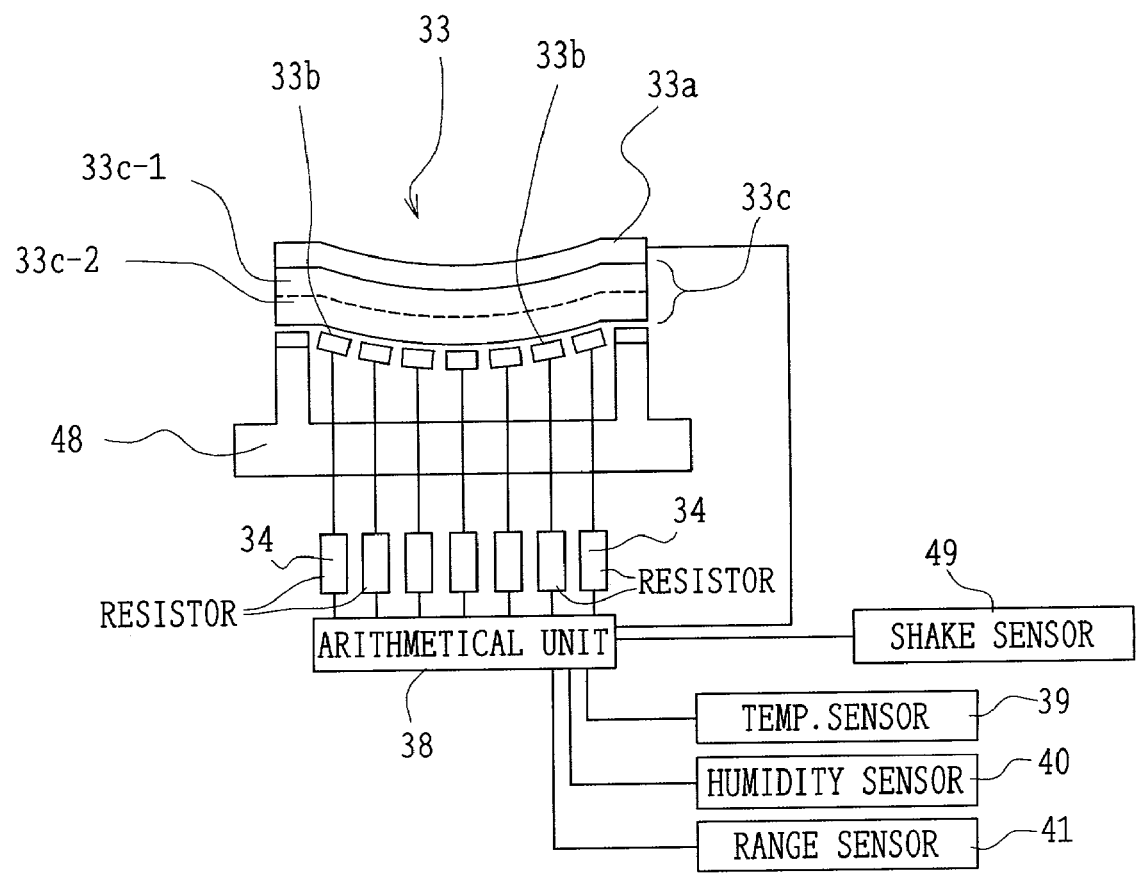
FIG. 18 is a schematic view showing a deformable mirror different in structure from that used in the twelfth embodiment.
Figure 21:
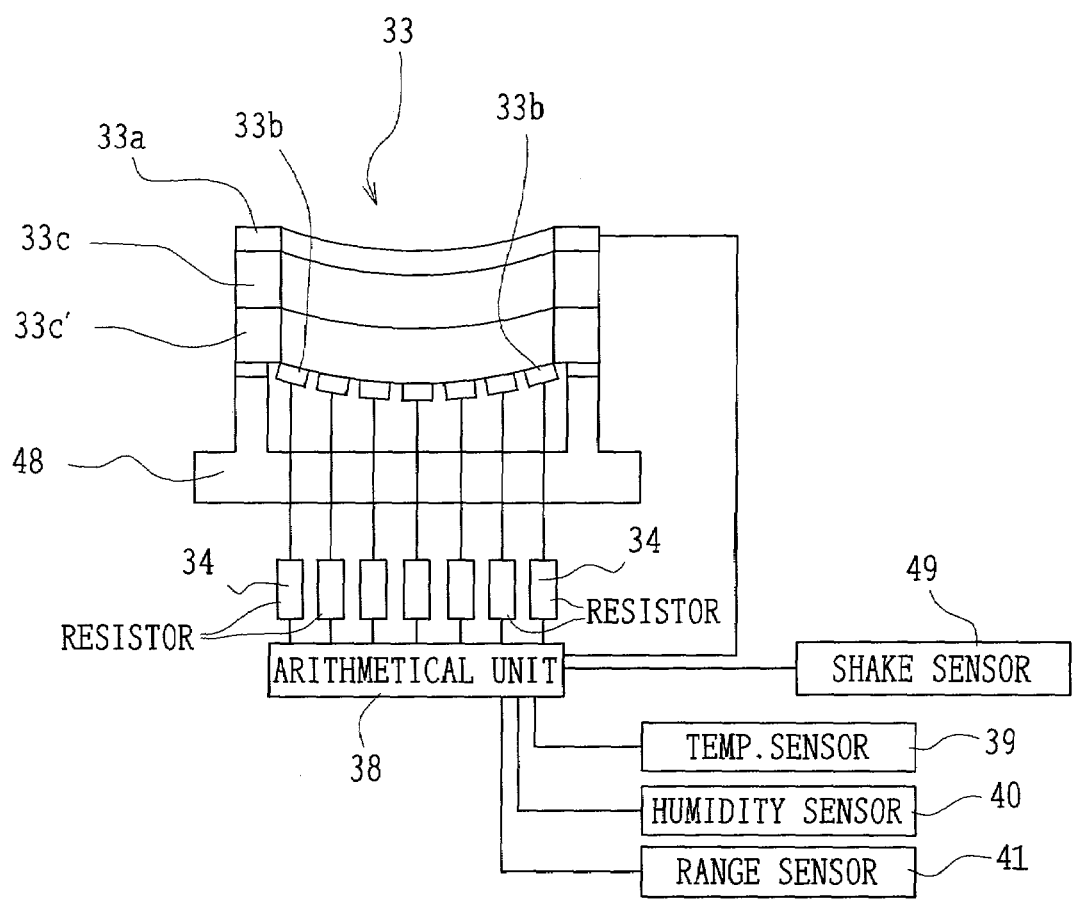
FIG. 21 is a schematic view showing the deformable mirror different in structure from that of FIG. 18.

FIG. 18 shows another embodiment of the deformable mirror 33. In this embodiment, a piezoelectric element 33c is interposed between the thin film 33a and the electrodes 33b, and these are placed on a support 48. A voltage applied to the piezoelectric element 33c is changed in accordance with the individual electrodes 33b, and thereby the piezoelectric element 33c causes expansion or contraction which is partially different so that the shape of the thin film 33a can be changed. The configuration of the electrodes 33b may be selected in accordance with the deformation of the thin film 33a. For example, as illustrated in FIG. 19, it may have a concentric division pattern, or as in FIG. 20, it may be a rectangular division pattern. As other patterns, proper configurations can be chosen. In FIG. 18, reference numeral 49 represents a shake sensor connected to the arithmetical unit 38. The shake sensor 49, for example, detects the shake of a digital camera and changes the voltages applied to the electrodes 33b through the arithmetical unit 38 and the variable resistors 34 in order to deform the thin film 33a to compensate for the blurring of an image caused by the shake. At this time, the signals from the temperature sensor 39, the humidity sensor 40, and range sensor 41 are taken into account simultaneously, and focusing and compensation for temperature and humidity are performed. In this case, stress is applied to the thin film 33a by the deformation of the piezoelectric element 33c, and hence it is good practice to design the thin film 33a so that it has a moderate thickness and a proper strength. FIG. 21 shows still another embodiment of the deformable mirror 33. This embodiment has the same construction as the embodiment of FIG. 18 with the exception that two piezoelectric elements 33c and 33c' are interposed between the thin film 33a and the electrodes 33b and are made with substances having piezoelectric characteristics which are reversed in direction. Specifically, when the piezoelectric elements 33c and 33c' are made with ferroelectric crystals, they are arranged so that their crystal axes are reversed in direction with respect to each other. In this case, the piezoelectric elements 33c and 33c' expand or contract in a reverse direction when voltages are applied, and thus there is the advantage that a force for deforming the thin film 33a becomes stronger than in the embodiment of FIG. 18 and as a result, the shape of the mirror surface can be considerably changed.

For substances used for the piezoelectric elements 33c and 33c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When the piezoelectric elements 33c and 33c' are used, it is also possible to properly deform the thin film 33a in the above embodiment if their thicknesses are made uneven.

For materials of the piezoelectric elements 33c and 33c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

When an electrostrictive substance, for example, acrylic elastomer or silicon rubber, is used for the piezoelectric elements 33 and 33c' shown in FIGS. 18 and 21, the piezoelectric element 33c, as indicated by a broken line in FIG. 18, may be constructed by cementing another substrate 33c-1 to an electrostrictive substance 33c-2 (see FIG. 18).

Figure 22:
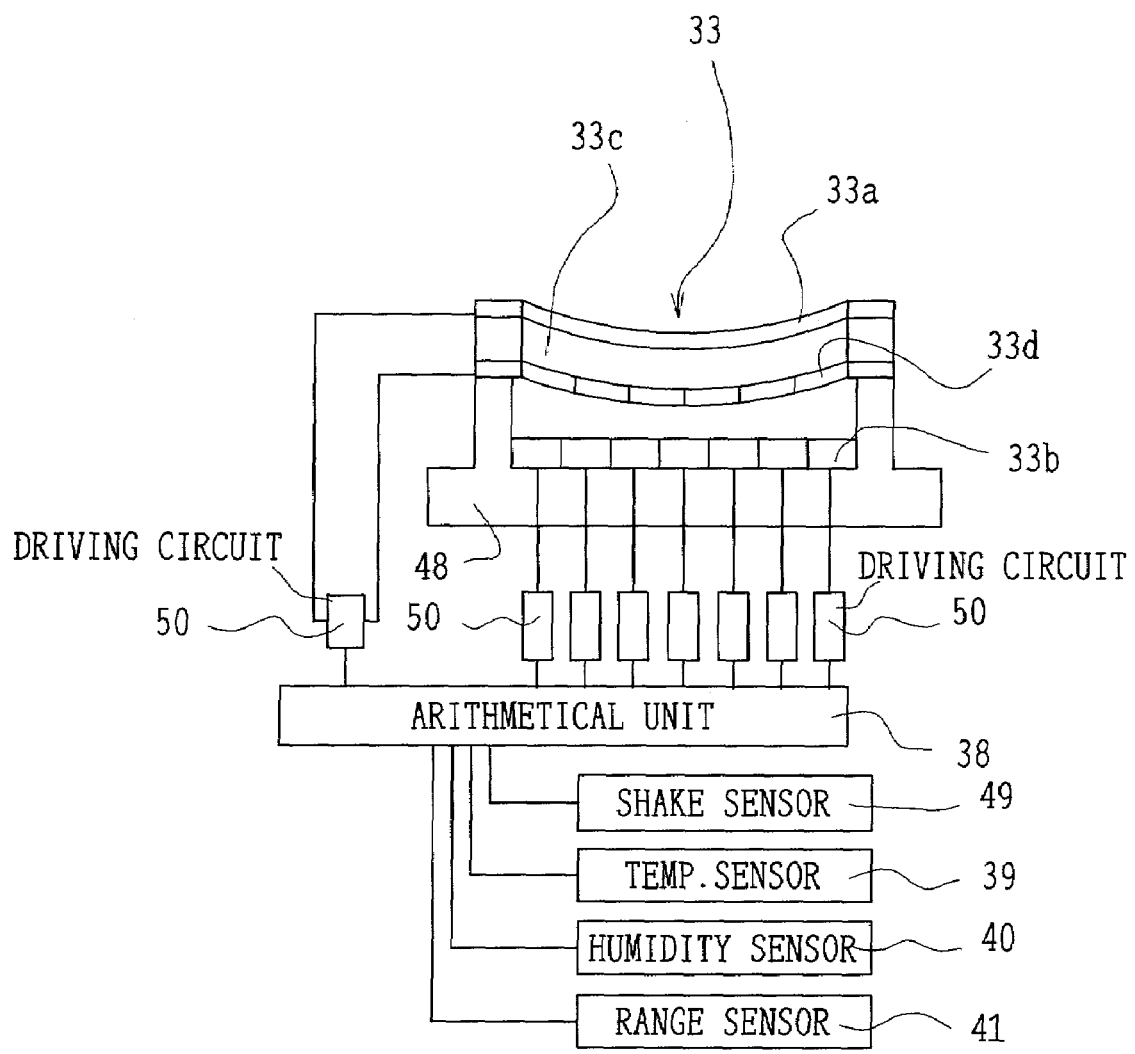
FIG. 22 is a schematic view showing the deformable mirror further different in structure.

FIG. 22 shows another embodiment of the deformable mirror 33. The deformable mirror 33 of this embodiment is designed so that the piezoelectric element 33c is sandwiched between the thin film 33a and an electrode 33d, and voltages are applied between the thin film 33a and the electrode 33d through driving circuits 50 controlled by the arithmetical unit 38. Furthermore, voltages are also applied to the electrodes 33b provided on the support 48, through the driving circuits 50 controlled by the arithmetical unit 38. In this embodiment, therefore, the thin film 33a can be doubly deformed by electrostatic forces due to the voltages applied between the thin film 33a and the electrode 33d and applied to the electrodes 33b. There are advantages that various deformation patterns can be provided and the response is quick, compared with any of the above embodiments.

By changing the signs of the voltages applied between the thin film 33a and the electrode 33d, the deformable mirror can be deformed into a convex or concave surface. In this case, a considerable deformation may be performed by a piezoelectric effect, while a slight shape change may be carried out by the electrostatic force. Alternatively, the piezoelectric effect may be used for the deformation of the convex surface, while the electrostatic force may be used for the deformation of the concave surface. Also, the electrode 33d may be constructed as a plurality of electrodes like the electrodes 33b. This condition is shown in FIG. 22. In the present invention, all of the piezoelectric effect, the electrostrictive effect, and electrostriction are generally called the piezoelectric effect. Thus, it is assumed that the electrostrictive substance is included in the piezoelectric substance.

Figure 23:
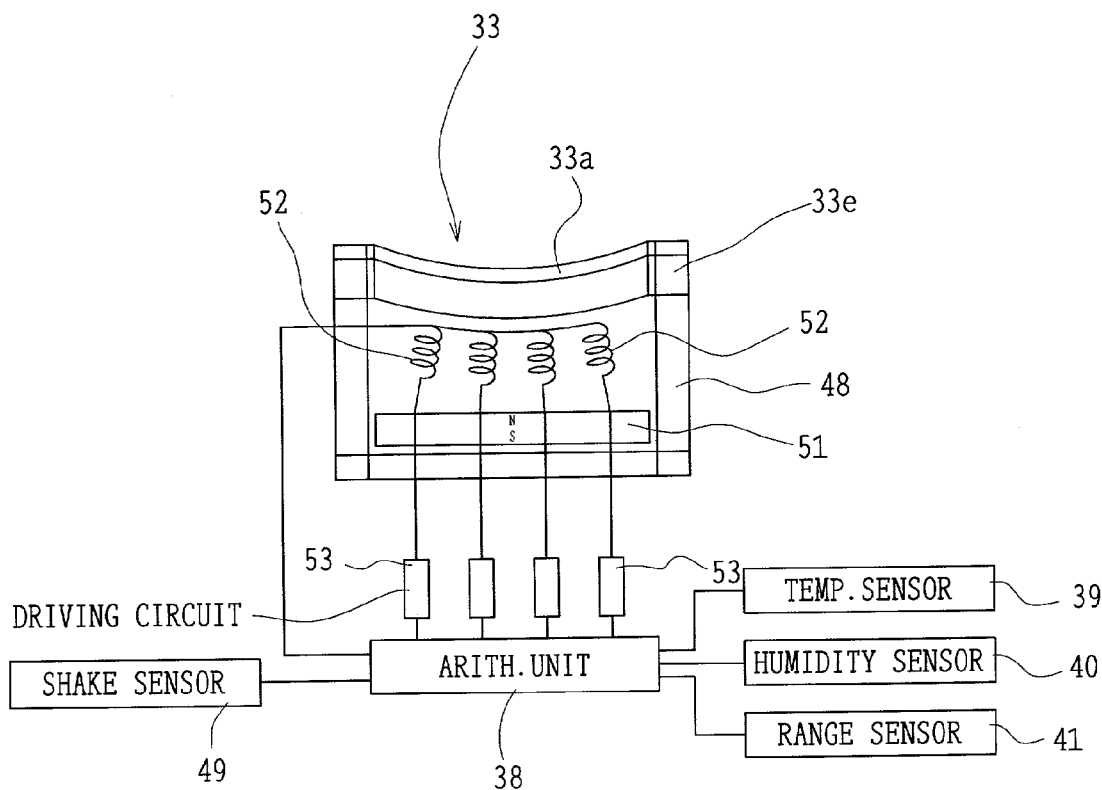
FIG. 23 is a schematic view showing the deformable mirror still further different in structure.

FIG. 23 shows another embodiment of the deformable mirror 33. The deformable mirror 33 of this embodiment is designed so that the shape of the reflecting surface can be changed by utilizing an electromagnetic force. A permanent magnet 51 mounted and fixed on a bottom surface inside the support 48, and the periphery of a substrate 33e made with silicon nitride or polyimide is mounted on the top surface thereof. The thin film 33a consisting of the coating of metal, such as aluminum, is deposited on the surface of the substrate 33e, thereby constituting the deformable mirror 33. Below the substrate 33e, a plurality of coils 52 are arranged and connected to the arithmetical unit 38 through the driving circuits 53. In accordance with output signals from the arithmetical unit 38 corresponding to changes of the optical system obtained at the arithmetical unit 38 by signals from the sensors 39, 40, 41, and 49, proper electric currents are supplied from the driving circuits 53 to the coils 52. At this time, the coils 52 are repelled or attracted by the electromagnetic force with the permanent magnet 51 to deform the substrate 33e and the thin film 33a.

In this case, a different amount of current can also be caused to flow through each of the coils 52. A single coil 52 may be used, and the permanent magnet 51 may be provided on the substrate 33e so that the coils 52 are arranged on the bottom side in the support 48. It is desirable that the coils 52 are fabricated by a lithography process. A ferromagnetic core (iron core) may be encased in each of the coils 52.

Figure 24:
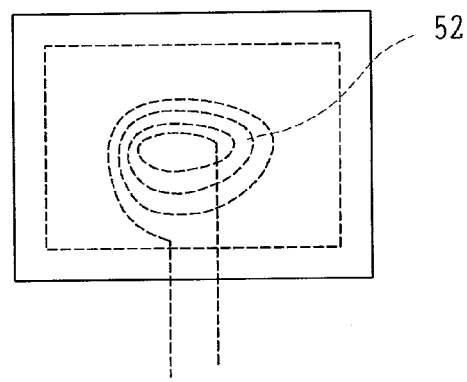
FIG. 24 is a view showing the winding density of a thin-film coil used in the deformable mirror of FIG. 23.

In this case, each of the coils 52, as illustrated in FIG. 24, can be designed so that a coil density varies with place and thereby a desired deformation is brought to the substrate 33e and the thin film 33a. A single coil 52 may be used.

Figure 25:
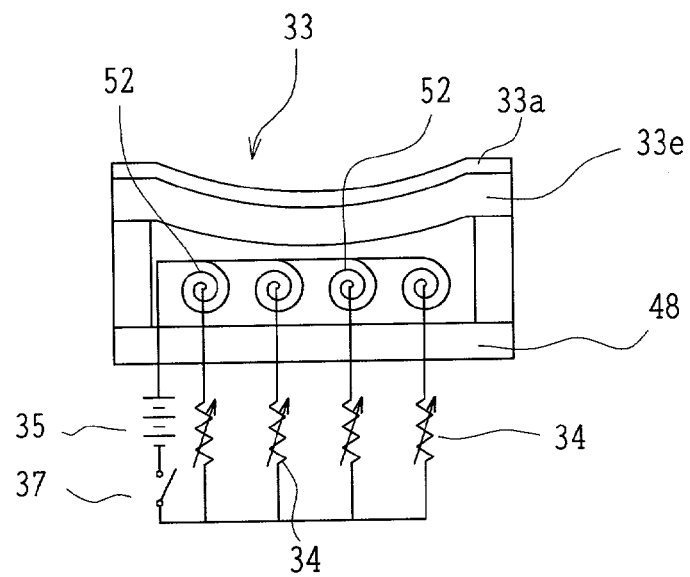
FIG. 25 is a schematic view showing the deformable mirror further different in structure.
Figure 26:
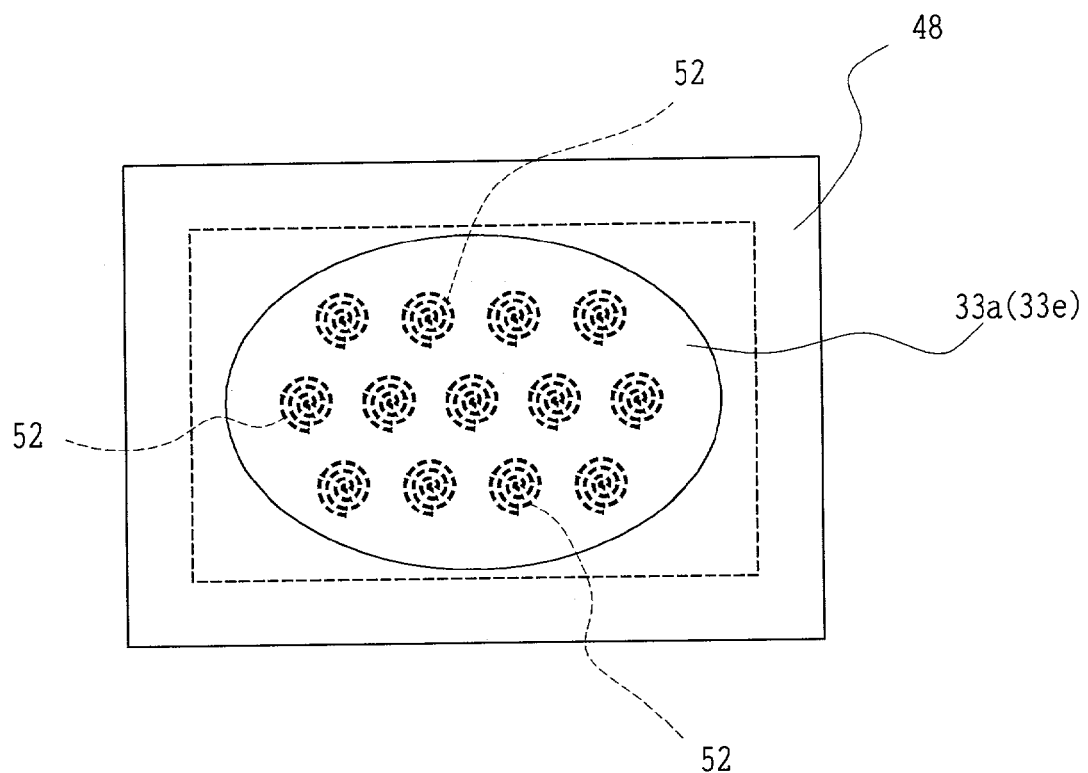
FIG. 26 is a view showing one example of an array of coils used in the deformable mirror of FIG. 25.
Figure 27:
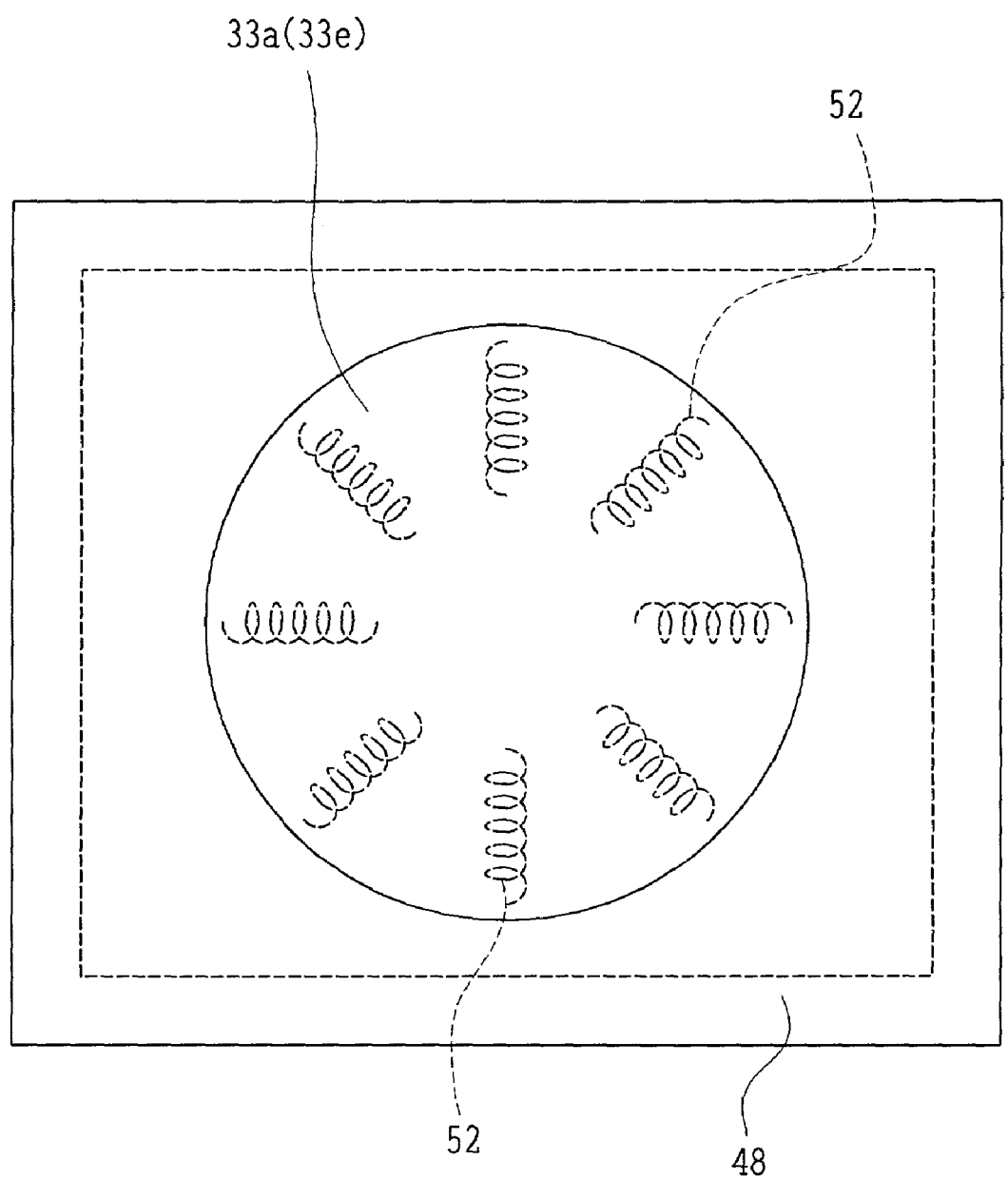
FIG. 27 is a view showing another example of an array of coils used in the deformable mirror of FIG. 25.
Figure 28:
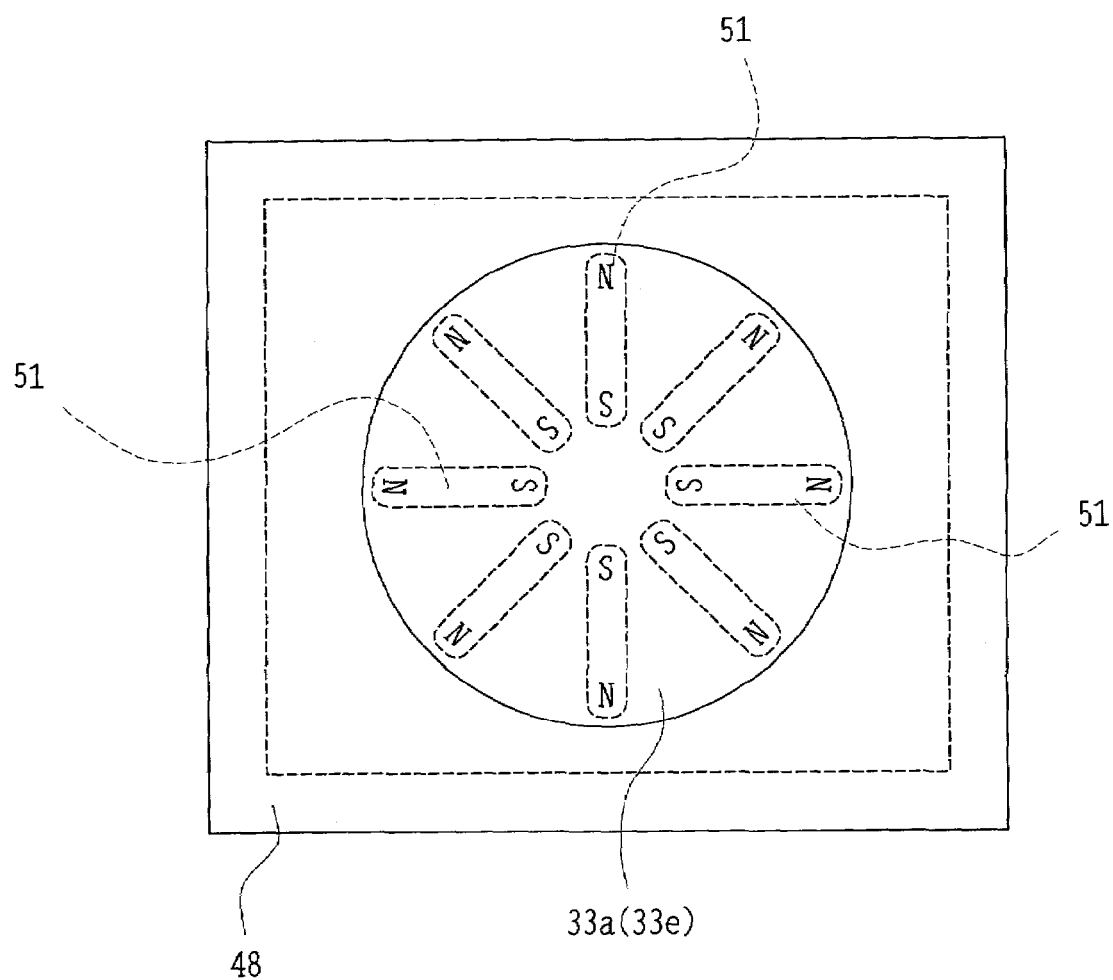
FIG. 28 is a view showing an array of permanent magnets suitable for the deformable mirror of the array of coils of FIG. 27.

FIG. 25 shows another embodiment of the deformable mirror 33. In the deformable mirror 33 of this embodiment, the substrate 33e is made with a ferromagnetic such as iron, and the thin film 33a as a reflecting film is made with aluminum. In this case, since the thin film coils need not be used, the structure is simple and the manufacturing cost can be reduced. If the power switch 37 is replaced with a changeover and power on-off switch, the directions of currents flowing through the coils 52 can be changed, and the configurations of the substrate 33e and the thin film 33a can be changed at will. FIG. 26 shows an array of the coils 52 in this embodiment, and FIG. 27 shows another array of the coils 52. These arrays are also applicable to the embodiment of FIG. 23. FIG. 28 shows an array of the permanent magnets 51 suitable for the array of the coils of FIG. 27 in the embodiment of FIG. 23. Specifically, when the permanent magnets 51, as shown in FIG. 28, are radially arranged, a delicate deformation can be provided to the substrate 33e and the thin film 33a in contrast with the embodiment of FIG. 23. As mentioned above, when the electromagnetic force is used to deform the substrate 33e and the thin film 33a (in the embodiments of FIGS. 23 and 25), there is the advantage that they can be driven at a lower voltage than in the case where the electrostatic force is used.

Some embodiments of the deformable mirror have been described, but as shown in FIG. 22, at least two kinds of forces may be used in order to change the shape of the deformable mirror. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

Thirteenth Embodiment

Figure 29:
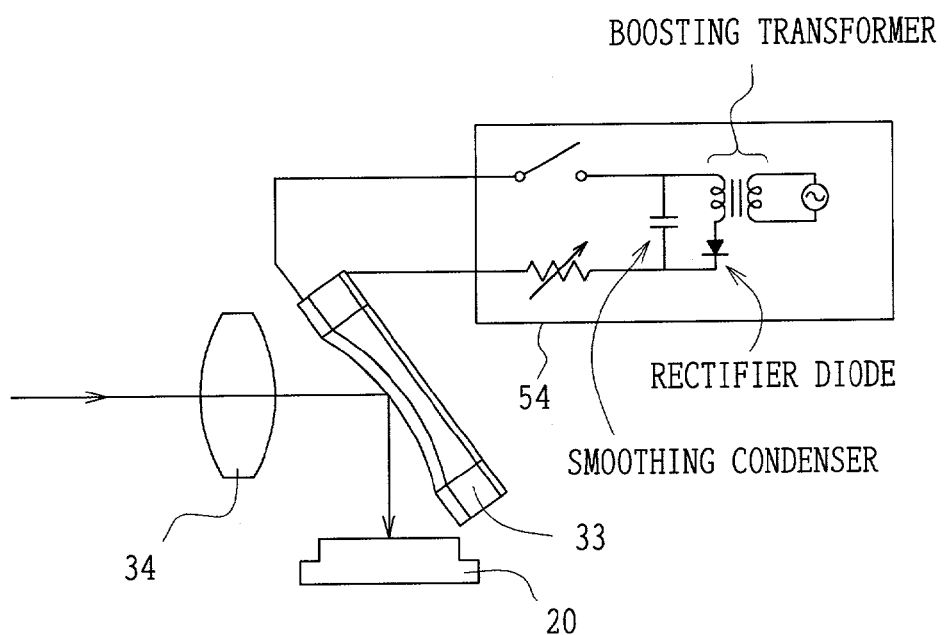
FIG. 29 is a schematic view showing a thirteenth embodiment of the present invention.

FIG. 29 shows an imaging system which uses the deformable mirror in the thirtennth embodiment of the present invention, and which is used, for example, in a digital camera of a cellular phone, a capsule endoscope, an electronic endoscope, a digital camera for personal computers, or a digital camera for PDAs.

In the imaging system of this embodiment, one imaging unit is constructed with the deformable mirror 33, the lens 34, the solid-state image sensor 20, and a control system 54. In the imaging unit of the embodiment, light from an object passing through the lens 34 is condensed by the deformable mirror 33 and is imaged on the solid-state image sensor 20. The deformable mirror 33 is a kind of variable optical-property element and is also referred to as the variable focal-length mirror.

According to this embodiment, even when the object distance is changed, the The embodiment need not use the motor to move the lens and excels in compact and lightweight design and low power consumption. The imaging unit can be used as the imaging system. When a plurality of deformable mirrors 33 are used, a zoom or variable magnification imaging system or optical system can be constructed.

In FIG. 29, an example of a control system which includes the boosting circuit of a transformer using coils in the control system 54 is cited. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

Fourteenth Embodiment

Figure 30:
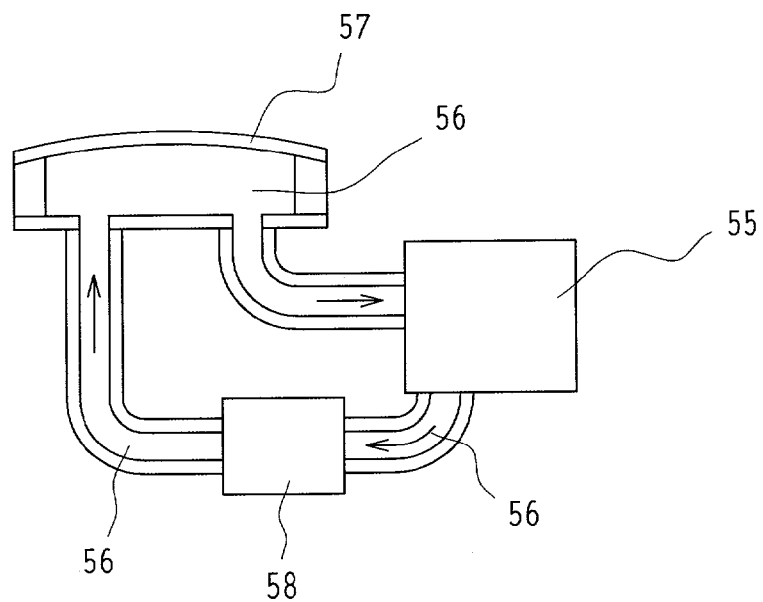
FIG. 30 is a schematic view showing a fourteenth embodiment of the present invention.

FIG. 30 shows the deformable mirror in the fourth embodiment of the present invention. This embodiment is constructed so that a fluid 56 is taken in and out by a micropump 55 and thereby a reflecting surface 57 can be deformed. According to the embodiment, there is the merit that the reflecting surface 57 can be considerably deformed.

The micropump 55 is a small-sized pump, for example, made by a micro-machining technique and is constructed so that it is operated with an electric power. Reference numeral 58 represents a liquid tank provided on a liquid passage.

As examples of pumps made by the micromachining technique, there are those which use thermal deformations, piezoelectric substances, and electrostatic forces.

Figure 31:
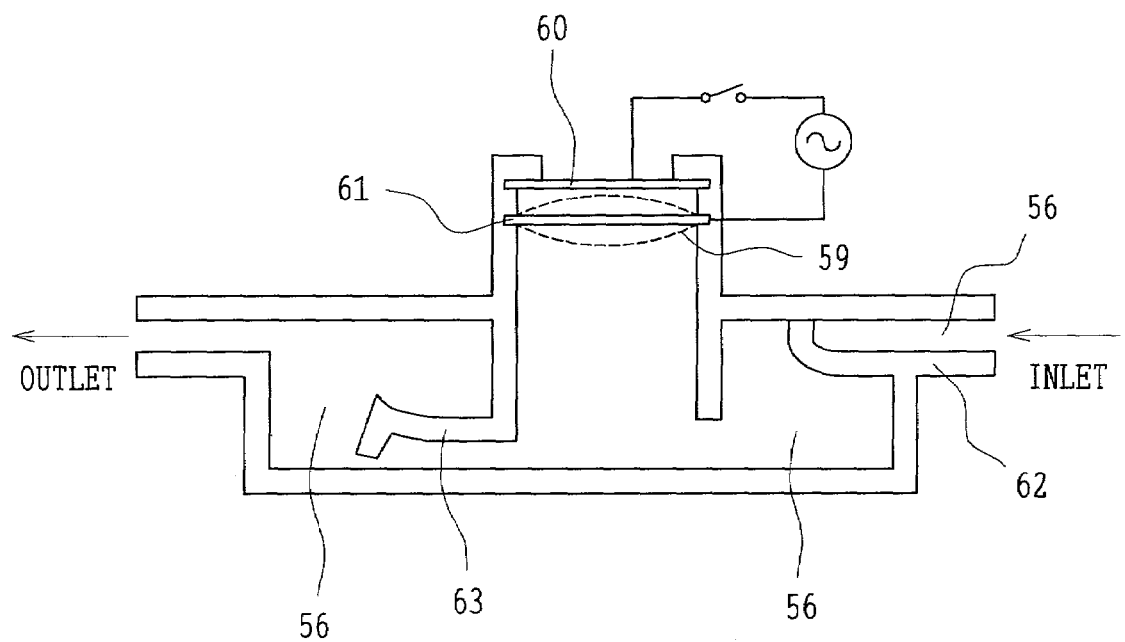
FIG. 31 is a schematic view showing a micropump applicable to the fourteenth embodiment.

FIG. 31 shows an example of a micropump 55. In the micropump of the embodiment, a vibrating plate 59 of the micropump is vibrated by the electrostatic force, namely an alternating voltage applied between electrodes 60 and 61. Dotted lines indicate the vibrating plate 59 where it is deformed. When the vibrating plate 59 is vibrated, two valves 62 and 63 are opened and closed to feed the fluid 56 in a direction indicated by arrows. The vibrating plate 59 may be constructed so that it is vibrated by the electric force of the piezoelectric effect.

In the embodiment, the reflecting film 59 is deformed into a concave or convex surface in accordance with the amount of the fluid 56, and thereby functions as the deformable mirror. An organic or inorganic substance, such as silicon oil, air, water, or jelly, can be used as the fluid 56.

In the deformable mirror or the variable focal-length lens which uses the electrostatic force or the piezoelectric effect, a high voltage is sometimes required for drive. In this case, for example, as shown in FIG. 29, it is desirable that the boosting transformer or the piezoelectric transformer is used to constitute the control system.

If the thin film 33a for reflection is also provided in a portion which is not deformed, it can be used as a reference surface when the profile of the deformable mirror is measured by an interferometer, which is convenient.

Finally, the terms used in the present invention will be described.

An optical apparatus used in the present invention refers to an apparatus including an optical system or optical elements. The optical apparatus need not necessarily function by itself. That is, it may be thought of as a part of an apparatus. The optical apparatus includes an imaging device, an observation device, a display device, an illumination device, and a signal processing device.

The imaging device refers to, for example, a film camera, a digital camera, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a cellular phone.

The illumination device includes, for example, a stroboscopic lamp for cameras, a headlight for cars, a light source for endoscopes, or a light source for microscopes.

The signal processing device refers to, for example, a cellular phone, a personal computer, a game machine, a read/write device for optical disks, or an arithmetic unit for optical computers.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

An extended surface is defined as follows:

Each of the surfaces of lenses, prisms, and mirrors need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In the present invention, it is assumed that such a surface is generally referred as to the extended surface.

The variable optical-property element includes a variable focal-length lens, a deformable mirror, a deflection prism whose surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element.

An information transmitter refers to a device which is capable of inputting and transmitting any information from a cellular phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

According to the present invention, as described above in detail, when the optical element is displaced in order to achieve focusing, zooming, and shake prevention, optical performance which is low in power consumption, quick in response speed, and high in accuracy can be obtained.

According to the present invention, the optical element, such as a mirror, lens, diffraction grating, or pinhole plate, can be tilted in various directions, with respect to incident light, in accordance with the electric potential imparted to the electrode, or can be moved along the optical axis of the incident light without any tilt. Moreover, the present invention has the advantage that it can be made to rest at preset control position, or can be continuously displaced as desired. In this case, torsion or extension is somewhat produced, but this is much smaller than in the conventional example. Since the position of the optical element is practically controlled by only bending displacement, power consumption is minimized. Furthermore, the fact that the number of parts is smaller and power consumption is lower than in the conventional example is extremely advantageous for compactness and cost reduction.

What is claimed is:

1. An optical apparatus comprising:
   a plate spring actuator; and
   a decentering optical system,
   wherein the platte spring actuator and the decentering optical system are constructed and arranged to make compensation for shake or a change in a direction of an optical axis or a change in a direction of a visual field, and
   wherein the plate spring actuator includes a support section and an electrode that is separately arranged from the support section.

2. An optical apparatus according to claim 1, wherein the plate spring actuator is driven by a piezoelectric effect.

3. An optical unit comprising:
   a plate spring actuator having at least one substrate with fixed electrodes and at least one substrate with a moving electrode; and
   an optical system or an optical element,
   wherein the at least one substrate with a moving electrode has a hole that is formed at a center of the substrate,
   wherein the optical system or the optical element is held through the hole,
   wherein the optical unit further comprises another plate spring actuator, to have two sets of plate spring actuators, and
   wherein the two sets of plate spring actuators, each having a substrate with fixed electrodes and a substrate with a moving electrode, are arranged so that the substrate with a moving electrode is opposite to a remaining substrate with a moving electrode, and the optical system is mounted to the substrate with a moving electrode and the remaining substrate with a moving electrode.

4. An optical apparatus using an optical unit according to claim 3.

5. An optical unit according to claim 3, wherein the plate spring actuator is driven by a piezoelectric effect.

6. An optical unit comprising:
   a first substrate comprising:
      a plurality of beam members, each having a crank- or curve-shaped flexible beam portion;
      a sheet member equipped with or constructed integrally with an optical element; and
      a frame member constructed and arranged to surround the sheet member, the plurality of beam members being connected with the sheet member and with the frame member, at least one of the sheet member and the beam members being constructed as a first layer electrode; and a second substrate that has a second layer electrode in an area opposite to the first layer electrode and is cemented to the frmne member, wherein when an electric potential between the first layer electrode and the second layer electrode is changed, the sheet member is displaced by an electrostatic force so that a position of the optical element is controlled on an optical path, and wherein the frame member and the sheet member are integrally constructed by fabrication of a single-crystal semiconductor substrate.

7. An optical unit according to claim 6, wherein the frame member is constructed by cutting our a semiconductor substrate, and the sheet member is a sheet part selectively survived by electrochemical etching from the semiconductor substrate.

8. An optical unit comprising:
a first substrate comprising:
a plurality of beam members, each having a crank- or curve-shaped flexible beam portion;
a sheet member equipped with or constructed integrally with an optical element; and
a frame member constructed and arranged to surround the sheet member,
the plurality of beam members being connected with the sheer member and with the frame member, at least one of the sheet member and the beam members being constructed as a first layer electrode; and
a second substrate that has a second layer electrode in an area opposite to the first layer electrode and is cemented to the frame member,
wherein when an electric potential between the first layer electrode and the second layer electrode is changed, the sheet member is displaced by an electrostatic force so that a position of the optical element is controlled on an optical path, and
wherein the frame member, the beam members, and the sheet member are integrally constructed by fabrication of a single-crystal semiconductor substrate.

9. An optical unit according to claim 8, wherein the frame member is constructed by cutting out a semiconductor substrate, and the sheet member and the beam members are sheet-shaped parts selectively survived by electrochernical etching from the semiconductor substrate, the beam members being smaller in thickness than the sheet members.

10. An optical unit comprising:
a first substrate comprising:
a plurality of beam members, each having a crank- or curve-shaped flexible beam portion;
a sheet member equipped with or constructed integrally with an optical element; and
a frame member constructed and arranged to surround the sheet member,
the plurality of beam members being connected with the sheet member and with the frame member, at least one of the sheet member and the beam members being constructed as a first layer electrode; and
a second substrate that has a second layer electrode in an area opposite to the first layer electrode and is cemented to the frame member,
wherein when an electric potential between the first layer electrode and the second layer electrode is changed, the sheet member is displaced by an electrostatic force so that a position of the optical element is controlled on an optical path, and
wherein the sheet member is provided with a through hole, and a transmission optical element is configured or mounted integrally with the through hole.

11. An optical unit according to claim 10, wherein, in an area opposite to the through hole provided to the sheet member, the second substrate is provided with a through hole.

12. An optical unit comprising:
a first substrate comprising:
a plurality of beam members, each having a crank- or curve-shaped flexible beam portion;
a sheet member equipped with or constructed integrally with an optical element; and
a flame member constructed and arranged to surround the sheet member,
the plurality of beam members being connected with the sheet member and with the frame member, at least one of the sheet member and the beam members being constructed as a first layer electrode; and
a second substrate that has a second layer electrode in an area opposite to the first layer electrode and is cemented to the frame member,
wherein when an electric potential between the first layer electrode and the second layer electrode is changed, the sheet member is displaced by an electrostatic force so that a position of the optical element is controlled on an optical path, and
wherein the sheet member is provided with a through hole, and a reflection optical clement is configured or mounted integrally with the through hole.

13. An optical unit according to claim 12, wherein, in an area opposite to the through hole provided to the sheet member, the second substrate is provided with a through hole.

14. An optical unit comprising:
a first substrate comprising:
a plurality of beam members, each having a crank- or curve-shaped flexible beam portion;
a sheet member equipped with or constructed integrally with an optical element; and
a frame nwmber constructed and arranged to surround the sheet member,
the plurality of beam members being connected with the sheet member and with the frame member, at least one of the sheet member and the beam members being constructed as a first layer electrode;
a second substrate that has a second layer electrode in an area opposite to the first layer electrode and is cemented to the frame member, and
a third substrate having a third layer electrode, the third substrate being placed on an opposite side of the second substrate with respect to the first substrate,
wherein when an electric potential between the first layer electrode and the second layer electrode is changed, the sheet member is displaced by an electrostatic force so that a position of the optical element is controlled on an optical path, and
wherein an electric potential between the first layer electrode and the third layer electrode is changed to thereby displace the sheet member by the electrostatic force so that the position of the optical element is controlled.

15. An optical unit comprising:
a first substrate comprising:
at least three beam members, each having a flexible beam portion;
a sheet member constructed integrally with an optical element; and
a frame member constructed and arranged to surround the sheet member,
the at least three beam members being connected with the sheet member and with the frame member, at least one of the sheet member and the beam members being constructed as a first electrode; and
a second substrate that has a second electrode in an area opposite to the first electrode and is cemented to the frame member,
wherein the sheet member has a hole that is formed at a center thereof, and the optical element is held through the hole, and
wherein when an electric potential between the first electrode and the second electrode is changed, the sheet member is displaced by an electrostatic force so that a position of the optical element is controlled.

16. An optical unit comprising two plate spring actuators, wherein each of the two plate spring actuators comprises:
an outer frame section;
an optical section positioned inside the outer frame section; and
a plurality of support sections,
wherein each of the plurality of support sections has a first connecting portion that is connected with the outer frame section and a second connecting portion that is connected with the optical section, and
wherein the two plate spring actuators are arranged along a predetermined axis in such a manner that the optical section of each of the two plate spring actuators traverses the predetermined axis.

17. An optical unit according to claim 16, wherein the optical unit performs, by using the plate spring actuator, one of a change in a direction of an optical axis, a change in a direction of a visual field, zooming, and magnification change.

18. An optical unit according to claim 16, wherein the optical section comprises one of a lens, a mirror, a prism and a deformable mirror.

19. An observation apparatus comprising:
an optical system; and
an optical unit according to claim 16.

20. An observation apparatus according to claim 19, wherein the observation apparatus is one of an endoscope, a finder, a binocular, and a face-mounted display.

21. An imaging apparatus comprising:
an image pickup member; and
an optical unit according to claim 16.

22. An imaging apparatus according to claim 21, wherein the imaging apparatus is one of an electronic imaging apparatus, a digital camera, and a TV camera.

23. A portable terminal apparatus comprising:
a display member; and
an optical unit according to claim 16.

24. A portable terminal apparatus according w claim 23, wherein the portable terminal appartius is one of a cellular phone and a personal digital assistant.

25. An optical unit comprising:
a plate spring actuator having at least one substrate with fixed electrodes and at least one substrate with a moving electrode; and
an optical system having at least one lens element mounted to the at least one substrate with a moving electrode,
wherein the optical system is displaced through the plate spring actuator,
wherein the plate spring actuator has two substrates with fixed electrodes and a substrate with a moving electrode interposed between the two substrates with fixed electrodes, and
wherein the optical system is held only through the at least one substrate with a moving electrode.

26. An optical unit according to claim 25, wherein the plate spring actuator is driven by a piezoelectric effect.

27. An optical apparatus using an optical unit according to claim 25.

28. An optical unit comprising:
a plate spring actuator having at least one substrate with fixed electrodes and at least one substrate with a moving electrode; and
an optical system or an optical element mounted to the at least one substrate with a moving electrode,
wherein at least one optical element constituting the optical system is displaced through the plate spring actuator,
wherein the optical unit further comprises another plate spring actuator, to have two sets of plate spring actuators, and
wherein the two sets of plate spring actuator, each having a substrate with fixed electrodes and a substrate with a moving electrode, are arranged so that the substrate with a moving electrode is opposite to a remaining substrate with a moving electrode, and the optical system is mounted to to substrate with a moving electrode and the remaining substrate with a moving electrode.

29. An optical unit according to claim 28, wherein the plate spring actuator is driven by a piezoelectric effect.

30. An optical apparatus using an optical unit according to claim 28.

* * * * *

UNITED STATES PATENT AND TRADEMARK OFFICE
CERTIFICATE OF CORRECTION

PATENT NO. : 7,170,665 B2
APPLICATION NO. : 10/201625
DATED : January 30, 2007
INVENTOR(S) : Shinji Kaneko et al.

It is certified that error appears in the above-identified patent and that said Letters Patent is hereby corrected as shown below:

Col. 22, line 26
replace "wherein the platte spring actuator"
with --wherein the plate spring actuator--.

Col. 23, line 7
replace "cemented to the frmne member"
with --cemented to the frame member--.

Col. 25, line 17
replace "by cutting our a semiconductor"
with --by cutting out a semiconductor--.

Col. 23, line 30
replace "the sheer member and with the frame member"
with --the sheet member and with the frame member--.

Col. 24, line 32
replace "hole, and a reflection optical clement is configured"
with --hole, and a reflection optical element is configured--.

Col. 24, line 46
replace "a frame nwmber constructed and arranged to surround"
with --a frame member constructed and arranged to surround--.

Col. 26, line 4
replace "A portable terminal apparatus according w claim 23"
with --A portable terminal apparatus according to claim 23--.

Col. 26, line 42
replace "wherein the two sets of plate spring actuator"
with --wherein the two sets of plate spring actuators--.

UNITED STATES PATENT AND TRADEMARK OFFICE
CERTIFICATE OF CORRECTION

PATENT NO. : 7,170,665 B2
APPLICATION NO. : 10/201625
DATED : January 30, 2007
INVENTOR(S) : Shinji Kaneko et al.

It is certified that error appears in the above-identified patent and that said Letters Patent is hereby corrected as shown below:

Col. 26, line 48
 replace "system is mounted to to substrate"
 with --system is mounted to substrate--.

Signed and Sealed this

Twentieth Day of November, 2007

JON W. DUDAS
*Director of the United States Patent and Trademark Office*